United States Patent
Fukushima et al.

(10) Patent No.: US 7,868,736 B2
(45) Date of Patent: Jan. 11, 2011

(54) SECURITY DEVICE, VEHICLE AUTHENTICATION DEVICE, METHOD AND PROGRAM

(75) Inventors: Shigeyuki Fukushima, Fuchu (JP); Koji Okada, Tokyo (JP)

(73) Assignees: Kabushiki Kaisha Toshiba, Tokyo (JP); Toshiba Solutions Corporation, Tokyo (JP)

( * ) Notice: Subject to any disclaimer, the term of this patent is extended or adjusted under 35 U.S.C. 154(b) by 1204 days.

(21) Appl. No.: 11/492,188

(22) Filed: Jul. 25, 2006

(65) Prior Publication Data

US 2006/0255910 A1 Nov. 16, 2006

Related U.S. Application Data

(63) Continuation of application No. PCT/JP2004/000656, filed on Jan. 26, 2004.

(51) Int. Cl.
G05B 19/00 (2006.01)
G06F 7/00 (2006.01)
G08B 29/00 (2006.01)
H04B 1/00 (2006.01)

(52) U.S. Cl. .......................... 340/5.8; 340/5.7; 340/5.6; 340/5.26; 340/10.1; 307/10.5; 307/10.1; 180/287

(58) Field of Classification Search .................. 340/5.8, 340/5.7, 5.6, 5.65, 5.26, 10.1, 10.2, 815.47, 340/815.48; 307/10.5, 10.1–10.6; 180/287
See application file for complete search history.

(56) References Cited

U.S. PATENT DOCUMENTS

| 5,635,900 A | | 6/1997 | Hasegawa et al. |
| 5,886,421 A | * | 3/1999 | Mizuno et al. ............. 307/10.5 |
| 5,955,981 A | * | 9/1999 | Rangan ....................... 341/173 |
| 6,332,572 B1 | * | 12/2001 | Yamamoto et al. .......... 235/382 |
| 6,604,181 B1 | | 8/2003 | Moriya |
| 6,617,975 B1 | * | 9/2003 | Burgess ................. 340/815.47 |
| 6,900,720 B2 | * | 5/2005 | Denison et al. ............. 340/5.9 |
| 6,903,651 B2 | * | 6/2005 | Matsuoka .................. 340/5.61 |
| 2002/0053027 A1 | * | 5/2002 | Kim ........................... 713/183 |

FOREIGN PATENT DOCUMENTS

| JP | 2506136 | 4/1996 |
| JP | 2697605 | 9/1997 |
| JP | 2000-352245 | 12/2000 |
| JP | 2001-12123 | 1/2001 |
| JP | 2002-274293 | 9/2002 |
| JP | 2002-302016 | 10/2002 |
| JP | 2003-182528 | 7/2003 |

OTHER PUBLICATIONS

International Preliminary Report and Written Opinion issued by the International Bureau of WIPO on Aug. 31, 2006, for International Application No. PCT/JP2004/000656.

* cited by examiner

*Primary Examiner*—Brian A Zimmerman
*Assistant Examiner*—Nam V Nguyen
(74) *Attorney, Agent, or Firm*—Finnegan, Henderson, Farabow, Garrett & Dunner, L.L.P.

(57) ABSTRACT

Apart from authentication of an electronic key, authentication of an ID card and authentication of user authentication information are executed. When all the authentications have been successfully made, engine startup information is produced. In this manner, even if electronic key data or an electronic key device has been copied, vehicle theft can be prevented.

11 Claims, 18 Drawing Sheets

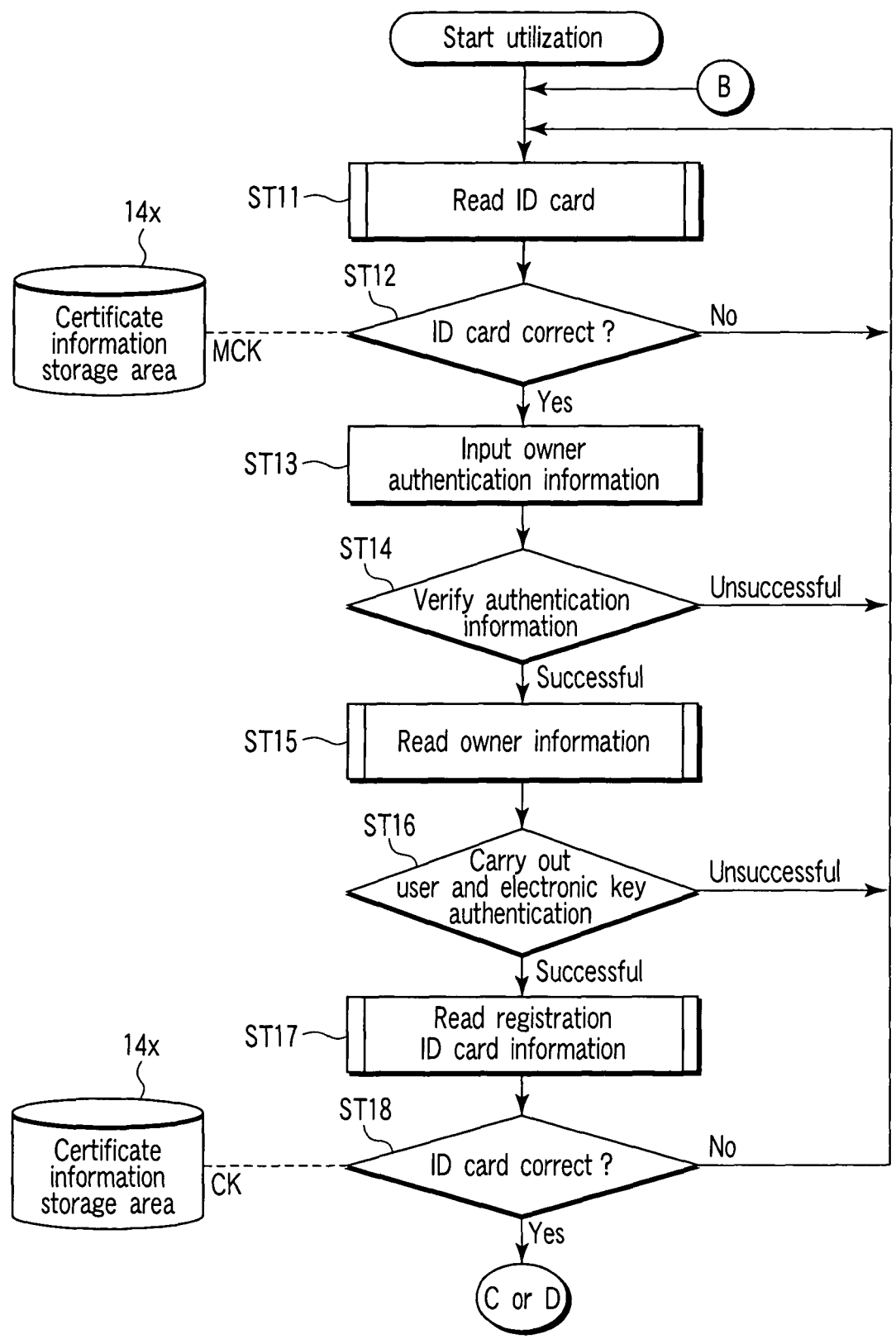
F I G. 7

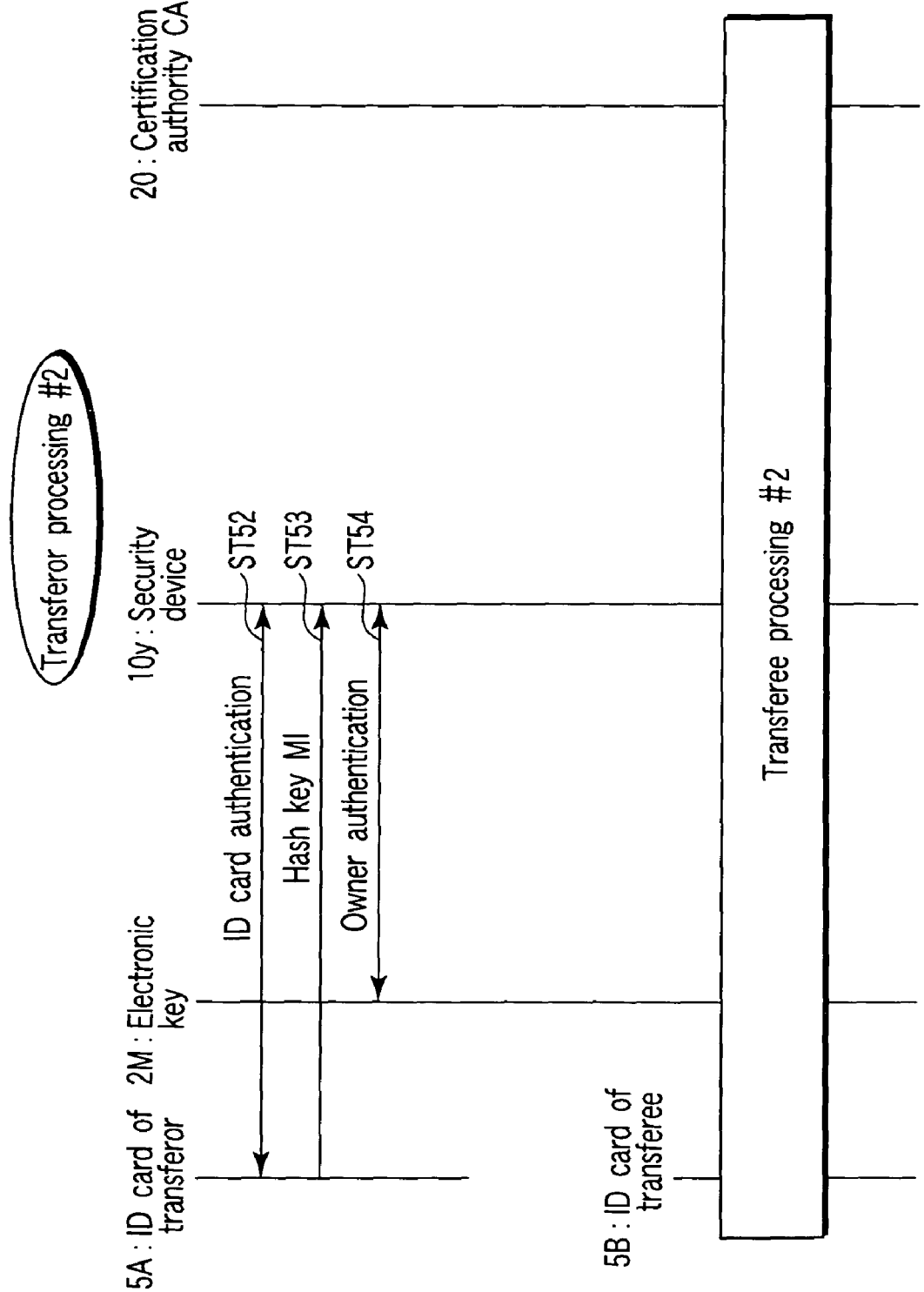
F I G. 15

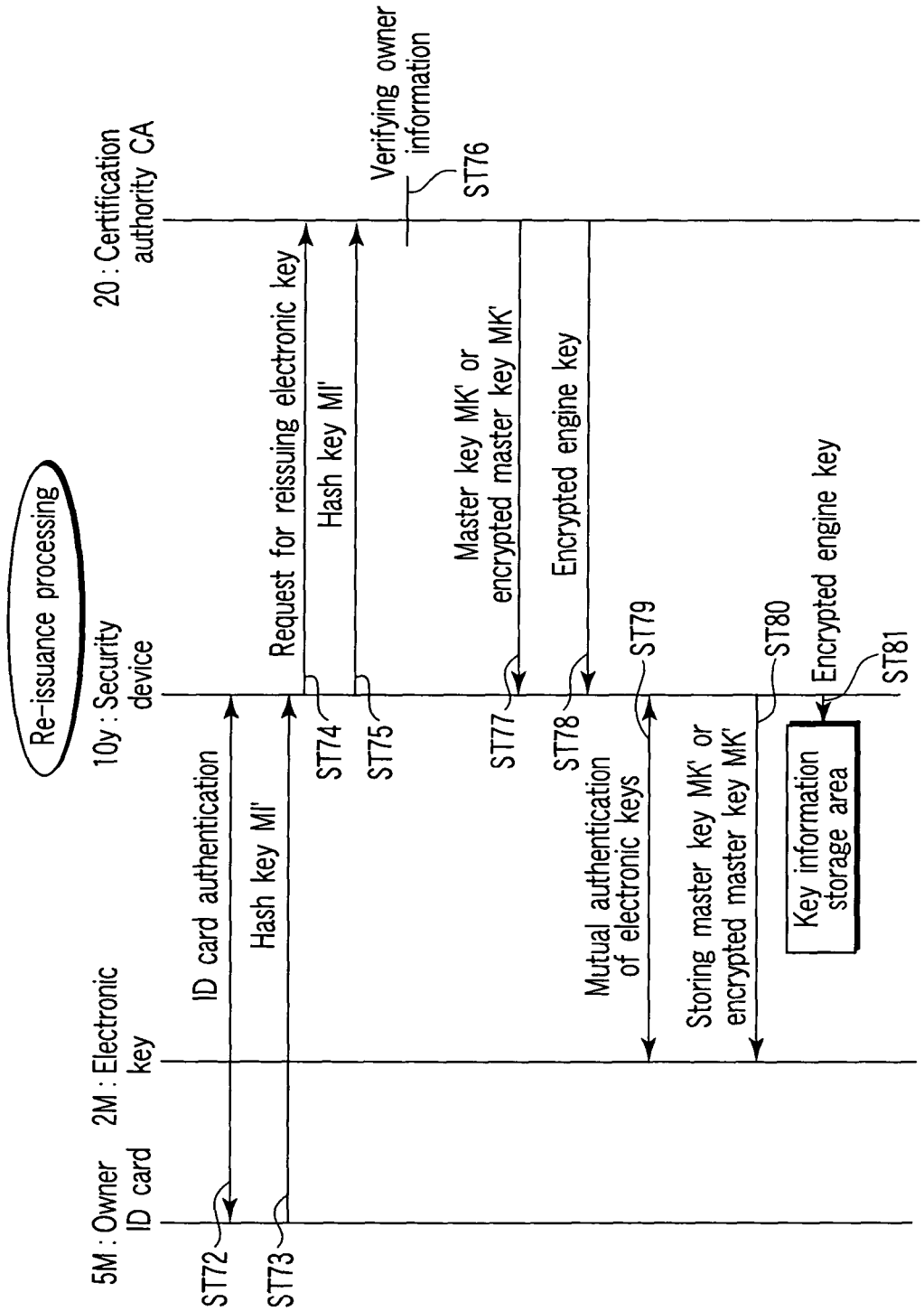
F I G. 18

SECURITY DEVICE, VEHICLE AUTHENTICATION DEVICE, METHOD AND PROGRAM

CROSS-REFERENCE TO RELATED APPLICATIONS

This is a Continuation Application of PCT Application No. PCT/JP2004/000656, filed Jan. 26, 2004, which was published under PCT Article 21(2) in Japanese.

BACKGROUND OF THE INVENTION

1. Field of the Invention

The present invention relates to a security device, a vehicle authenticating device, a method, and a program.

2. Description of the Related Art

Conventionally, from the viewpoint of preventing vehicle theft, an electronic key system such as a keyless entry system or an immobilizer system is known (refer to Jpn. Pat. No. 2506136 and 2697605, for example).

Here, in the keyless entry system, for example, an electronic key device transmits electronic key data by infrared radiation, and then door opening/closing or engine startup is carried out by means of matching the electronic key data. In the immobilizer system, for example, when an electronic key device is inserted into a keyhole, the electronic key device transmits the ID of the electronic key, and then the engine is started up by matching the ID.

The electronic key system of this type is characterized in that key duplication is largely impossible as compared with a physical key system in which a duplicate key can be produced from a keyhole or a spare key. Thus, the electronic key system is viewed as a technique for easily preventing vehicle theft.

However, in the electronic key of the keyless entry system or immobilizer system as described above, there is a possibility that a vehicle can be stolen in accordance with methods (i) and (ii) described below:

(i) A method for copying electronic key data transmitted by infrared radiation; and (ii) A method for copying an electronic key device by stealing the ID of an electronic key.

These methods (i) and (ii) can be easily realized in the case where a criminal colludes with a dealer. Thus, it is thought to be necessary to take countermeasures.

In addition, in vehicle transfer including selling or resale, in the case where a transferor has copied an electronic key before transfer, it is possible for the transferor to drive a vehicle after transfer, and thus, there is a risk of a vehicle being stolen.

BRIEF SUMMARY OF THE INVENTION

It is an object of the present invention to provide a security device, vehicle authenticating device, method, and program capable of preventing a vehicle theft even if electronic key data or an electronic key device has been copied.

According to a first aspect of the present invention, there is provided a security device for use in a vehicle authenticating device which is mounted on a vehicle capable of running in accordance with engine startup information and which authenticates a user of the vehicle based on an electronic key device having electronic key data (K) stored therein, the security device comprising: key information storage means for storing an encrypted engine master key (E (EK)) obtained by encrypting an engine master key (EK) in accordance with the electronic key data (K); certificate information storage means for storing an ID device certificate verification key (CK) to verify a certificate in an ID device having a personal information, the certificate (C), and a user specific key (I) stored therein; means for verifying the certificate (C) input from the ID device by using the IC device certificate verification key (CK) in the certificate information storage means to confirm validity of the ID device; means for, after confirming the validity, causing the ID device to verify the input user authentication information; means for, when a verification result by this ID device has been successfully obtained, authenticating a user and an electronic key by using the user specific key I input from the ID device and the electronic key data K input from the electronic key device; means for, when authentications of the user and electronic key have been successfully made, decrypting the encrypted engine master key (E (EK)), and then, obtaining an engine master key (EK), based on the electronic key data (K); means for producing the engine startup information by using the engine master key EK; and means for outputting the obtained engine startup information.

Therefore, according to a first aspect of the present invention, after a certificate C input from an ID device has been verified by using an ID device certificate verification key CK, when validity of the ID device is confirmed, the input user authentication information is verified by means of the ID device. When the result of the verification by the ID device is successful, the user and an electronic key are authenticated by using a user specific key I contained in the ID device and electronic key data K contained in the electronic key device. When authentication of the user and electronic key is successful, engine startup information is produced.

In this way, after authentication of the ID device and authentication of the user authentication information have been executed separately from authentication of the electronic key, when all authentications are successful, the engine startup information is produced. Thus, even if the electronic key data or electronic key device has been copied, vehicle theft can be prevented.

BRIEF DESCRIPTION OF THE SEVERAL VIEWS OF THE DRAWING

FIGS. 7 and 8 are flowcharts for explaining a whole operation in the present embodiment.

FIG. 15 is a sequence chart for explaining a fourth embodiment of the present invention.

FIG. 18 is a sequence chart for explaining a fifth embodiment of the present invention.

DETAILED DESCRIPTION OF THE INVENTION

Hereinafter, embodiments of the present invention will be described with reference to the accompanying drawings.

First Embodiment

Figure 1:
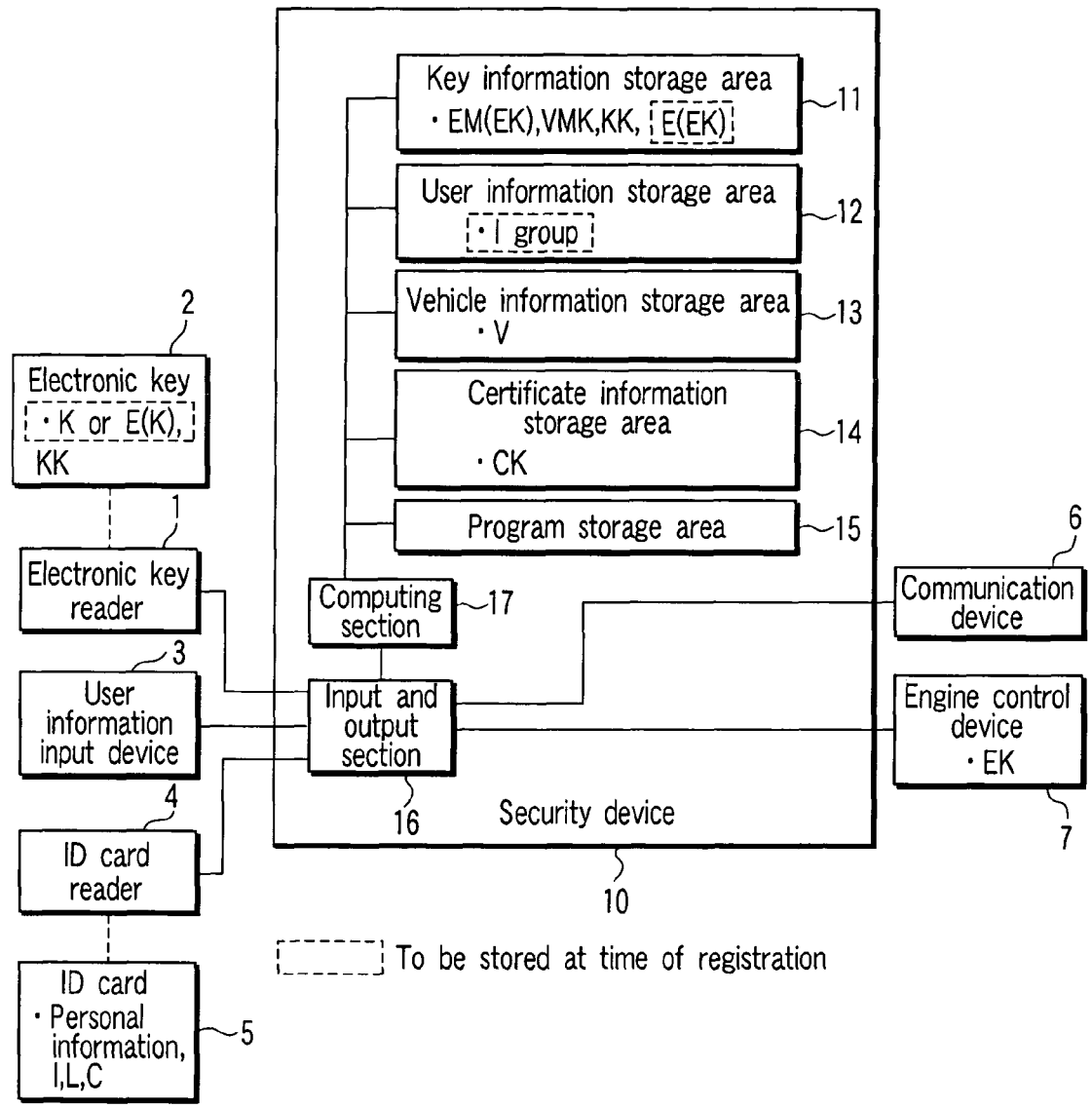
FIG. 1 is a schematic view depicting a configuration of a vehicle authenticating device according to a first embodiment of the present invention.

FIG. 1 is a block diagram depicting a configuration of a vehicle authenticating device according to a first embodiment of the present invention. This vehicle authenticating device is mounted on a vehicle such as a car, and an electronic key reader 1, a user information input device 3, an ID card reader 4, a communication device 6, and an engine control device 7 are connected to a security device 10.

Here, the electronic key reader 1 has: a function of inserting and removing a portable electronic key 2, and then, transmitting the data read from the electronic key 2 to the security device 10; and a function of inputting the data received from the security device 10 to the electronic key 2.

In the electronic key (electronic key device) 2, for example, an electronic key that corresponds to a general keyless entry or immobilizer system or a contact/non-contact type ID card is available. Specifically, this electronic key comprises an tamperproof area for storing an electronic key communication key KK, electronic key data K, or encrypted electronic key data E (K). Here, the user's electronic key data K is intended to decrypt an engine master key EK, and includes a signature (digital signature) generated by an owner's electronic key data signature generating key SMK. In addition, the electronic key communicating key KK is provided as an authenticating key for communication, and is stored at the time of shipment from a manufacturer. The electronic key data K or encrypted electronic key data E (K) is stored at the time of key registration.

The user information input device 3 is intended to input information for verifying a user (a PIN or biometric information such as a fingerprint, for example) to the security device 10.

The ID card reader 4 has a function of inserting and removing a portable ID card 5 (for example, IC card driver's license), and then, transmitting the data read from the ID card 5 to the security device 10; and a function of inputting the data received from the security device 10 to the ID card 5.

The ID card (ID device) 5 has a general IC card function and is capable of communicating with the security device 10 via the ID card reader 4. This ID card stores personal information for specifying an individual user, a hash key (user specific key) I generated from this personal information, license classification information L issued on the receipt of a driver's license, and a certificate C issued from a specific authorized organization. Here, the privacy information, the hash key I, the license classification information L, and certificate C are stored at the time of ID card issuance. The data contained in the ID card 5 can be read/written only by a person having a specific privilege. The ID card owner can read the data, but cannot write it.

In addition, the ID card 5 can be changed to an arbitrary ID device such as a cellular phone, an electronic notebook, a personal computer, an ID tag, a pendant, a badge, or an electronic book, without being limited to a card shaped ID device. In this case, similarly, it is a matter of course that the ID card reader 4 can be changed to a reader of an arbitrary ID device without being limited to an ID card reader.

The communication device 6 has a communication function between an outside of a vehicle and the security device 10.

The engine control device 7 has a tamperproof area for storing the engine master key EK at the time of shipment from a manufacturer. This device has a function of carrying out mutual authentication with the security device 10 by using this engine master key EK and a function of, when mutual authentication has been successfully made and if engine startup information S is received from the security device 10, controlling an engine. The engine master key EK is provided as an authenticating key for starting up an engine. The engine startup information S is generated by using the engine master key EK in the security device 10. In addition, the term "engine" denotes a power generator, and includes a motor without being limited to an internal combustion engine.

On the other hand, the security device 10 is intended to carry out a security processing operation such as validity verification of the ID card 5 or electronic key 2 and user authentication. Specifically, this device comprises a key information storage area 11, a user information storage area 12, a vehicle information storage area 13, a certificate information storage area 14, a program storage area 15, an input/output section 16, and a computing section 17.

The key information storage area 11 is provided as an area for storing in advance: an encrypted engine master key EM (EK) that corresponds to electronic key data MK of an owner (purchaser), an electronic key data signature verification key VMK and an electronic key communication key KK at the time of vehicle delivery from a manufacturer; and an encrypted engine master key E (EK) that corresponds to the user's electronic key data K before use.

Here, the encrypted engine master key EM (EK) is produced when the engine master key EK is encrypted by means of electronic key data MK and a hash key MI described later. An electronic key data signature verification key VMK is provided as a key for verifying a signature of electronic key data K.

The user information storage area 12 is provided as an area for carrying out user registration before use and storing the user's hash key group.

The vehicle information storage area 13 is provided as an area for storing vehicle classification information V on the vehicle at the time of shipment from a manufacturer. The vehicle classification information V is provided as information for judging whether or not the vehicle can be driven in response to license classification information L.

The certificate information storage area 14 is provided as an area for storing at the time of shipment from a manufacturer an ID card certificate verification key CK that is a key for verifying an ID card for validity. The ID card certificate verification key CK is provided as a key for verifying validity of a certificate C of an ID card.

The program storage area 15 is provided as an area for storing a program for controlling the computing section 17. Specifically, the program used here is intended to cause the computing section 17 to execute a processing operation shown in FIG. 2 and any one of FIGS. 3 to 5.

The input/output section 16 is intended to carry out data transmission and receiving or user input and output between the security device 10 and each of the external devices 1 to 5.

The computing section 17 is intended to carry out computation, matching, and authentication of security. Specifically, this computing section is provided as a car-mounted CPU that operates under the program contained in the program storage area 15 with reference to each of the storage areas 11 to 15.

Now, an operation of the vehicle authenticating device configured above will be described with reference to the flowcharts shown in FIGS. 2 to 5.

(Whole Operation)

A user exhibits an ID card 5 to an ID card reader 4 when getting in a vehicle.

Figure 2:
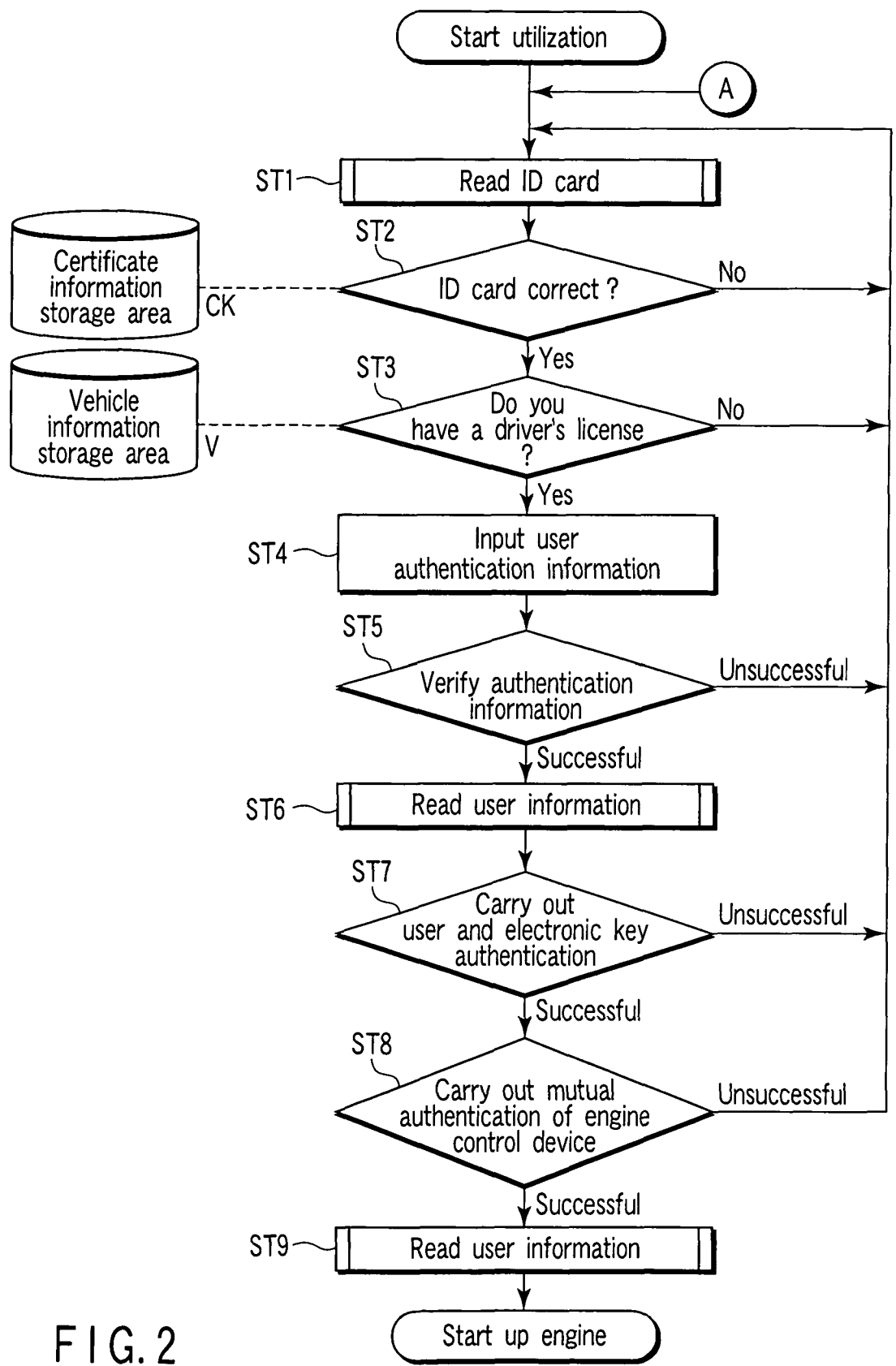
FIG. 2 is a flowchart for explaining a whole operation in the present embodiment.

A security device 10, as shown in FIG. 2, reads a certificate C and license classification information L from the ID card 5 through this ID card reader 4 (ST1).

The security device 10 verifies the validity of the certificate C by using an ID card certificate verification key CK contained in a certificate information storage area 14 in order to verify whether or not this ID card 5 is an ID card issued from an authorized organization (ST2).

In the case where the validity verification has failed (ST2: NO), the security device 10 judges that the ID card is not the above ID card issued from the authorized organization, and then, processing returns to step ST1.

In the case where the validity verification has been successfully made (ST2: NO), the security device 10 judges that the above ID card is the ID card issued from the authorized organization. Then, the security device verifies whether or not license classification information L coincides with vehicle classification information V set in the vehicle information storage area 13 contained in the security device 10 (ST3). The license classification information denotes information relating to license classification by vehicle such as class 1 regular size vehicle, class 2 regular size vehicle, or class 1 large size vehicle.

In the case where the license classification information L and the vehicle classification information V do not coincide with each other (ST3: NO), it is judged that a driver's license of the vehicle is not assigned, and then, processing reverts to step ST1.

In the case where they coincide with each other (ST3: YES), it is judged that a driver's license of the vehicle is assigned, and the security device 10 prompts input of the user information from a display panel or the like (not shown) of an input/output section 16.

The user inputs the user authentication information P (biometric authentication information such as a fingerprint, or a PIN) for reading the user information contained in the ID card 5 through the user information input device 3. In this manner, the user authentication information P is input to the security device 10 (ST4).

The security device 10 transmits the input user authentication information P to the ID card 5 through the ID card reader 4, and causes the ID card 5 to verify the authentication information (ST5).

In the case where verification of the authentication information has failed (ST5: Unsuccessful), it is judged that the user is an invalid user, a result indicative of the failure is returned to the security device 10, and then, processing reverts to step ST1.

In the case where verification of the authentication information has been successfully made (ST5: Successful), it is judged that the user is a valid user, the ID card 5 returns a hash key I to the security device 10, and the security device 10 reads the hash key I and stores the read key in the user information storage area 12 (ST6).

Next, the security device 10 carries out authentication of the user and electronic key by using the electronic key 2 (ST7), and decrypts the encrypted engine master key E (EK) stored in the key information storage area 11 together with this authentication. A detailed description of step ST7 will be given with reference to FIGS. 3 to 5.

In the case where authentication has failed (ST7: Unsuccessful), it is judged that the user is an invalid user of an electronic key, and then, processing reverts to step ST1.

In the case where authentication has been successfully made (ST7: Successful), it is judged that the user is a valid user of an electronic key, the security device 10 carries out mutual authentication with the engine control device 7 (ST8). In mutual authentication, there are used: an engine master key EK decrypted in the security device 10; and an engine master key EK stored in the engine control device 7.

In the case where mutual authentication has failed (ST8: Unsuccessful), it is judged that at least one of the devices is an invalid device, and then, processing reverts to step ST1.

In the case where mutual authentication has been successfully made (ST8: Successful), it is judged that both of these devices are valid devices, and the security device 10 transmits engine startup information S to the engine control device 7 by using the engine master key EK (ST9).

In this manner, the engine control device 7 can start up an engine.

(First Specific Example of ST7: User and Electronic Key Authentication)

Now, three specific examples of step ST7 will be described with reference to FIGS. 3 to 5.

Figure 3:
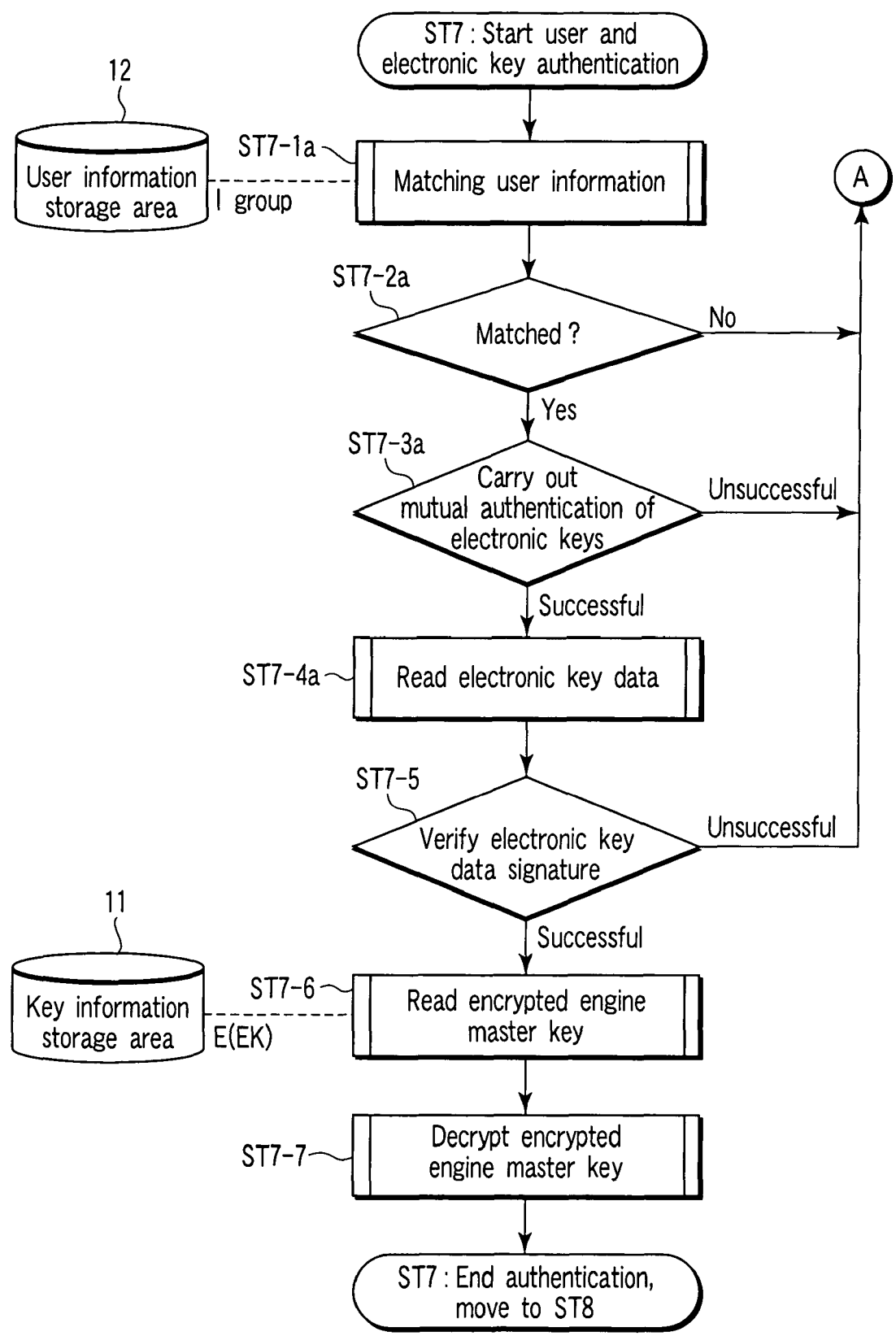
FIGS. 3 to 5 are flowcharts for explaining first to third specific examples of user and electronic key authentication in the present embodiment.

FIG. 3 is a flowchart showing a first specific example of step ST7.

The security device 10 matches a user's hash key I read from the ID card 5 and a hash key group I contained in a user information storage area 12 in step ST6 (ST7-1a). As a result of matching, in the case where no coincidence with the hash key I is obtained (ST7-2a: NO), it is judged that the user is an unregistered user, and processing reverts to step ST1.

In the case where coincidence is obtained (ST7-2a: YES), it is judged that the user is a registered user, and the security device 10 promotes the user to mount an electronic key 2 from an input and output section 16. The user mounts the electronic key 2 on the electronic key reader 1. In this manner, the security device 10 carries out mutual authentication with the electronic key 2 via the electronic key reader 1 (ST7-3a). In mutual authentication, there are used: an electronic key communication key KK contained in the key information storage area 11 of the security device 10; and an electronic key communication key KK stored in the electronic key 2.

In the case where mutual authentication has failed (ST7-3a: Unsuccessful), it is judged that at least one of the devices is an invalid device, and then, processing reverts to step ST1. In the case where mutual authentication has been successfully made (ST7-3a: Successful), it is judged that both of the devices are valid devices, the electronic key 2 returns the electronic key data K to the security device 10, and then, the security device 10 reads the electronic key data K (ST7-4).

Next, the security device 10 verifies a signature of the electronic key data K by using an electronic key data signature verification key VMK contained in the key information storage area 11 (ST7-5). As a result of signature verification, in the case where the signature is invalid (ST7-5: Unsuccessful), it is judged that the key is an illegally issued electronic key, and then, processing reverts to step ST1.

In the case where the signature is valid (ST7-5: Successful), it is judged that the key is a properly issued electronic key, and then, the security device 10 reads an encrypted engine master key E (EK) that corresponds to the electronic key data K from the key information storage area 11 (ST7-6). In this manner, the security device 10 decrypts the encrypted engine master key E (EK) by using the electronic key data K (ST7-7), and obtains an engine master key EK. The obtained engine master key EK is used in succeeding steps ST8 and ST9, as described previously.

(Second Specific Example of ST7: User and Electronic Key Authentication)

Figure 4:
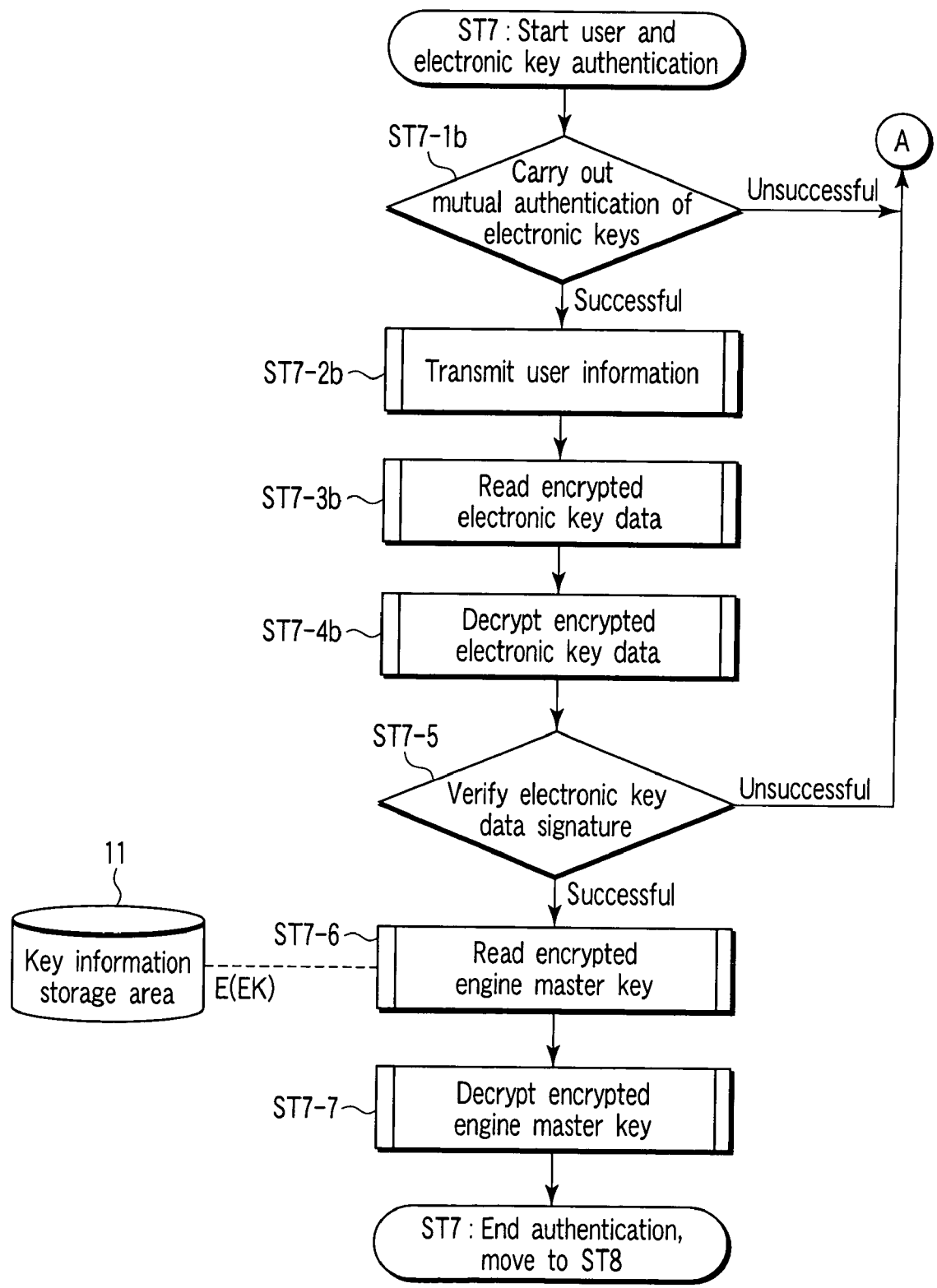

FIG. 4 is a flowchart showing a second specific example of step ST7. Here, electronic key data K is assumed to be stored in an electronic key 2 in a state in which the data is encrypted by using a hash key I.

A user mounts the provided electronic key 2 on an electronic key reader 1. In this manner, the security device 10 carries out mutual authentication with the electronic key 2 via the electronic key reader 1 (ST7-1b). In mutual authentication, there are used: an electronic key communication key KK contained in a key information storage area 11 of the security device 10 and an electronic key communication key KK stored in the electronic key 2.

In the case where mutual authentication has failed (ST7-1b: Unsuccessful), it is judged that at least one of the devices is an invalid device, and then, processing reverts to step ST1.

In the case where mutual authentication has been successfully made (ST7-1b: Successful), it is judged that both of the above devices are valid devices, and the security device 10 transmits a hash key I to the electronic key 2 through the electronic key reader 1 (ST7-2b). The electronic key 2 transmits encrypted electronic key data E (K) to the security device 10, and the security device 10 reads the encrypted electronic key data E (K) (ST7-3b). Then, the security device 10 decrypts this encrypted electronic key data E (K) by means of the hash key I, and obtains electronic key data K (ST7-4b).

Subsequently, steps ST7-5 to ST7-7 are executed similarly as described previously.

(Third Specific Example of ST7: User and Electronic Key Authentication)

Figure 5:
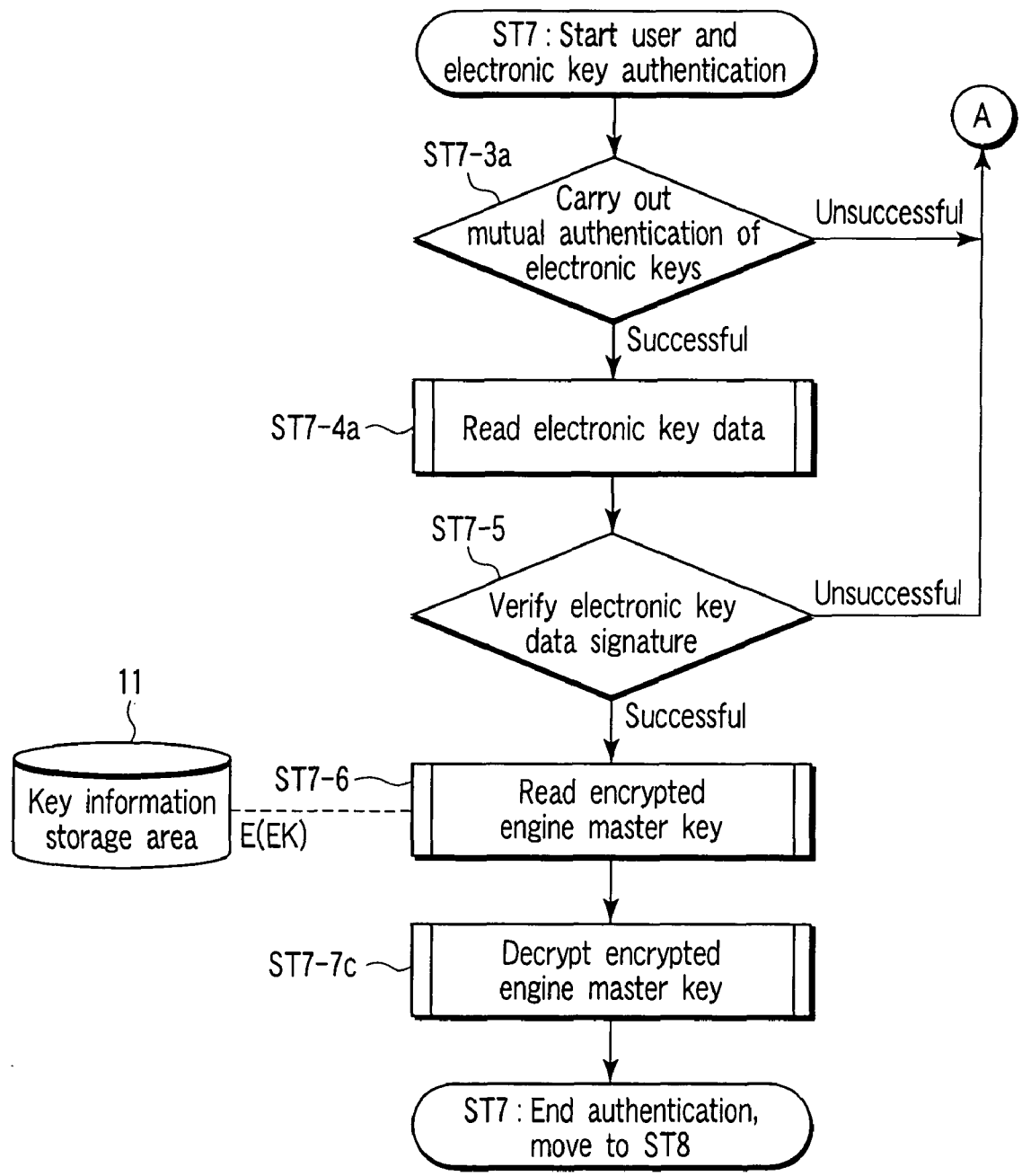

FIG. 5 is a flowchart showing a third specific example of step ST7. Here, an encrypted engine master key E (EK) is assumed to be stored in a key information storage area 11 in a state in which the key has been encrypted by using a hash key I and electronic key data K.

As shown in FIG. 5, steps ST7-1a and ST7-2a shown in FIG. 3 are eliminated, and steps ST7-3a to ST7-6 shown in FIG. 3 are executed in the same manner as described previously.

Subsequently, a security device 10 decrypts the encrypted engine master key E (EK) (ST7-7c) and obtains an engine master key EK by using the user's hash key I and electronic key data K read in step ST6 described previously.

As described above, according to the present embodiment, apart from authentication of an electronic key, authentication of an ID card and authentication of the user authentication information are executed. When all the authentications have been successfully made, engine startup information is produced. Thus, even if electronic key data or an electronic key device has been copied, a vehicle theft can be prevented.

In this manner, after an owner purchasing a vehicle from a vehicle manufacturer, for example, has newly issued an electronic key for using a vehicle, only when the electronic key and the user's ID card are used together, engine control can be achieved. In addition, since an electronic key for using a vehicle can be issued only when an issue key for issuing this electronic key and the owner's ID card are used together, vehicle theft by a criminal is unlikely even in a situation in which a dealer and the criminal are in close liaison with each other.

In addition to the advantageous effect as described above, the user and electronic key authentication in step ST7 can attain the following advantageous effects in each of the specific examples shown in FIGS. 3 to 5.

In the case of an example shown in FIG. 3, since a linkage between information on an issued electronic key and information specific to a user is not established, there is no need for the user's ID card 5 at the time of issuance of the electronic key 2. Namely, the issuance of the electronic key 2 and user registration can be carried out in an asynchronous manner.

However, on the other hand, after user matching in step ST7-2 has been avoided by any means and when it becomes possible for processing to revert to step ST7-3, there is a danger that user authentication is not achieved. Thus, there is a need for a mechanism for preventing program falsification in the security device 10.

In the case of an example shown in FIG. 4, unlike FIG. 3, a linkage between information on an issued electronic key 2 and information specific to a user is established. Thus, there is a need for the user's ID card 5 at the time of issuance of the electronic key 2. In addition, at the time of using the electronic key 2 (at the time of engine startup), there is a need for the ID card 5. In addition, if an attempt is made to steal the electronic key 2 in order to obtain the internal electronic key data K, the electronic key is encrypted based on information I contained in the user's ID card 5, thus making it difficult to illegally use the information without the user's ID card.

In the case of an example shown in FIG. 5, unlike FIG. 3, a linkage between information on an issued electronic key 2 and information specific to a user is established. Thus, there is a need for the user's ID card 5 at the time of issuance of the electronic key 2. In addition, at the time of using the electronic key (at the time of engine startup), there is a need for the ID card 5. However, unlike a technique shown in FIG. 4, the electronic key data K contained in the electronic key 2 is not encrypted. Thus, if it becomes possible to read electronic key data K by any means, there is a danger that key forgery can be partially achieved, although it is not perfect. Therefore, there is a need for the electronic key data K to be stored in a tamperproof area, thereby disabling reading due to disassembling or the like of the electronic key 2.

Second Embodiment

Figure 6:
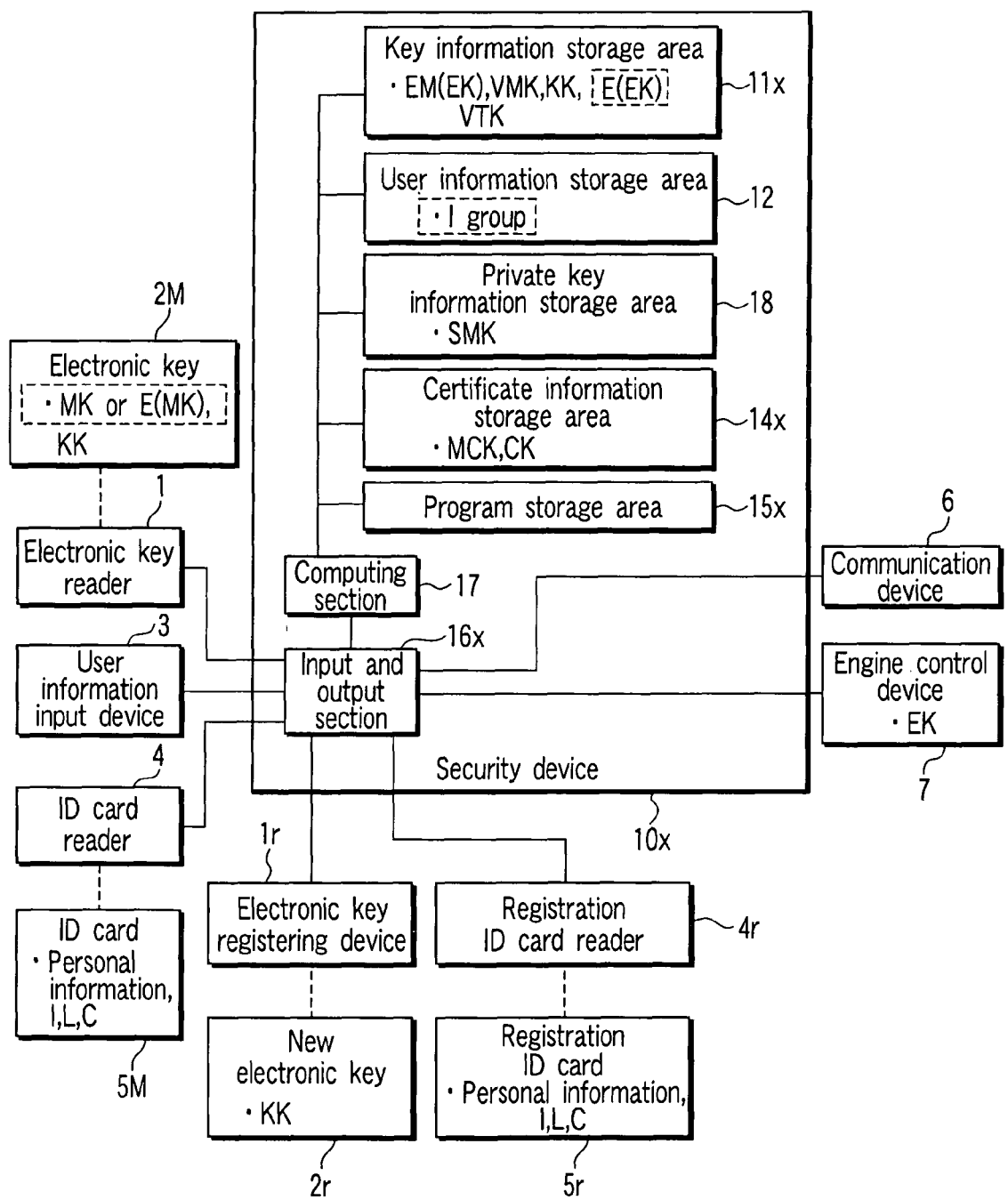
FIG. 6 is a schematic view depicting a configuration of a vehicle authenticating device according to a second embodiment of the present invention.

FIG. 6 is a block diagram depicting a configuration of a vehicle authenticating device according to a second embodiment of the present invention. Like constituent elements as those shown in FIG. 1 are designated by like reference numerals. Alphabetic subscripts M, r, x or the like are assigned to modified elements. A primary description will be given with respect to the modified elements. In the following embodiments as well, a description of like constituent elements is omitted here similarly.

That is, the present embodiment is provided as a modified example of the first embodiment, and shows a configuration in which a vehicle owner registers a user. The owner and registrant are assumed to be members of a family, for example.

A specific configuration is featured in that an electronic key registering device 1r and a registration ID card reader 4r having functions similar to those of the electronic key reader 1 and the ID card reader 4 described previously are connected to a security device. In the security device 10, a vehicle information storage area 13 is eliminated, and a private key information storage area 18 is provided.

In addition, the owner's electronic key 2M and ID card 5M and the registrant's electronic key 2r and ID card 5r are used instead of the user's electronic key 2 and ID card 5 described previously.

Here, as the electronic key 2M, for example, the electronic key and ID card described previously can be used. Specifically, this electronic key comprises a tamperproof area for storing electronic key communication key KK and the owner's electronic key data MK or encrypted electronic key data E (MK). Here, the owner's electronic key data MK includes a signature generated by an electronic key data signature generating key STK managed by a manufacturer. In addition, the electronic key communication key KK is stored at the time of shipment from a manufacturer, and the electronic key data MK or encrypted electronic key data E (MK) are stored at the time of key registration.

The registrant's electronic key 2r specifically comprises a tamperproof area for storing the electronic key communication key KK and the user's electronic key data K or encrypted electronic key data E (K). Here, both of the electronic key data K and the encrypted electronic key data E (K) are assumed to be in an unregistered state. In addition, the electronic key communication key KK is stored at the time of shipment from a manufacturer.

The owner's ID card 5M has a general IC card function, and is capable of communicating with the security device 10 via the ID card reader 4. This ID card stores personal information for specifying an individual owner; a hash key generated from the personal information; and a certificate MC issued from a specific authorized organization.

The registrant's ID card 5r is similar to the user's ID card 5 described previously. In addition, the data contained in the ID cards 5M and 5r can be read/written by only a person having a specific privilege, and the ID card owner can read the card, but cannot write to it, in the same manner as that described previously.

On the other hand, a key information storage area 11x stores an electronic key data signature verification key VTX for verifying a signature generated by a vehicle manufacture, in addition to the key information EM (EK), VMK, KK, and E (EK) described previously.

A certificate information storage area 14x stores, at the time of shipment from a manufacturer, an ID card certificate verification key MCK that is a key for verifying whether or not the card is a valid ID card 5M of an owner, in addition to the ID card certificate verification key CK of the user (registrant) described previously. Additionally, the ID card certificate verification key MCK is provided as a key for verifying validity of a certificate MC contained in the ID card 5M.

Figure 8:
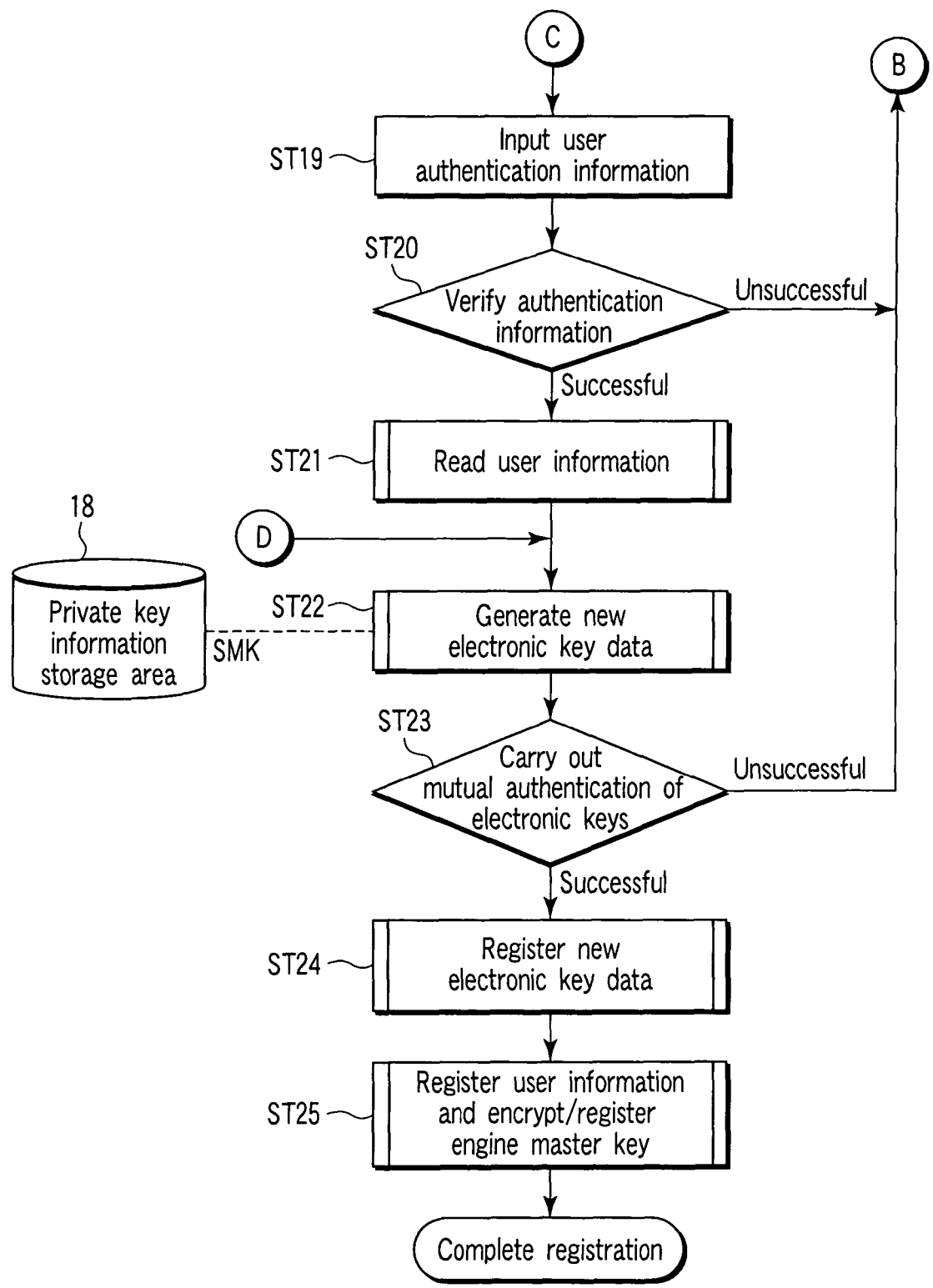
Figure 9:
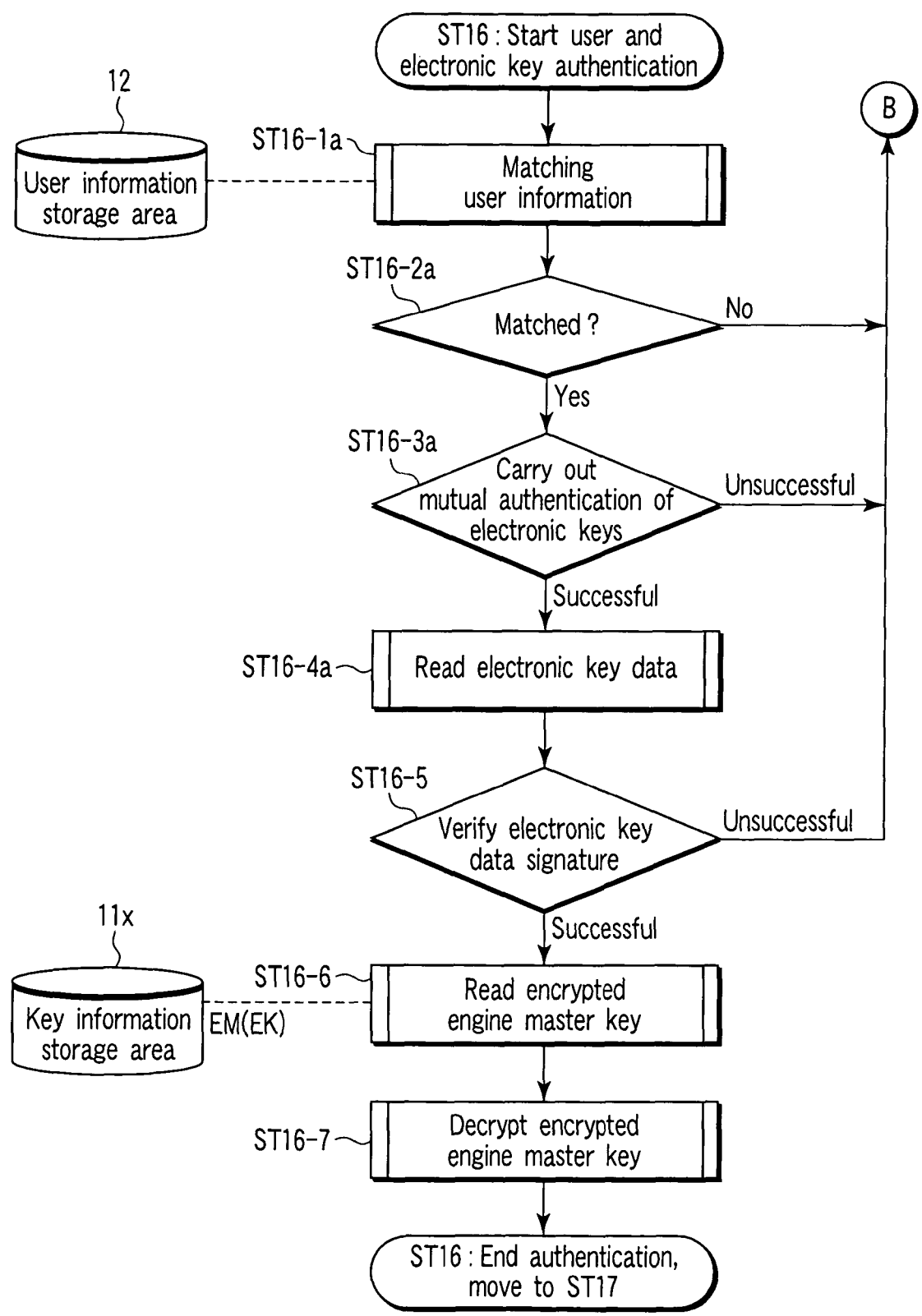
FIGS. 9 to 11 are flowcharts for explaining first to third specific example of user and electronic key authentication in the present embodiment.
Figure 10:
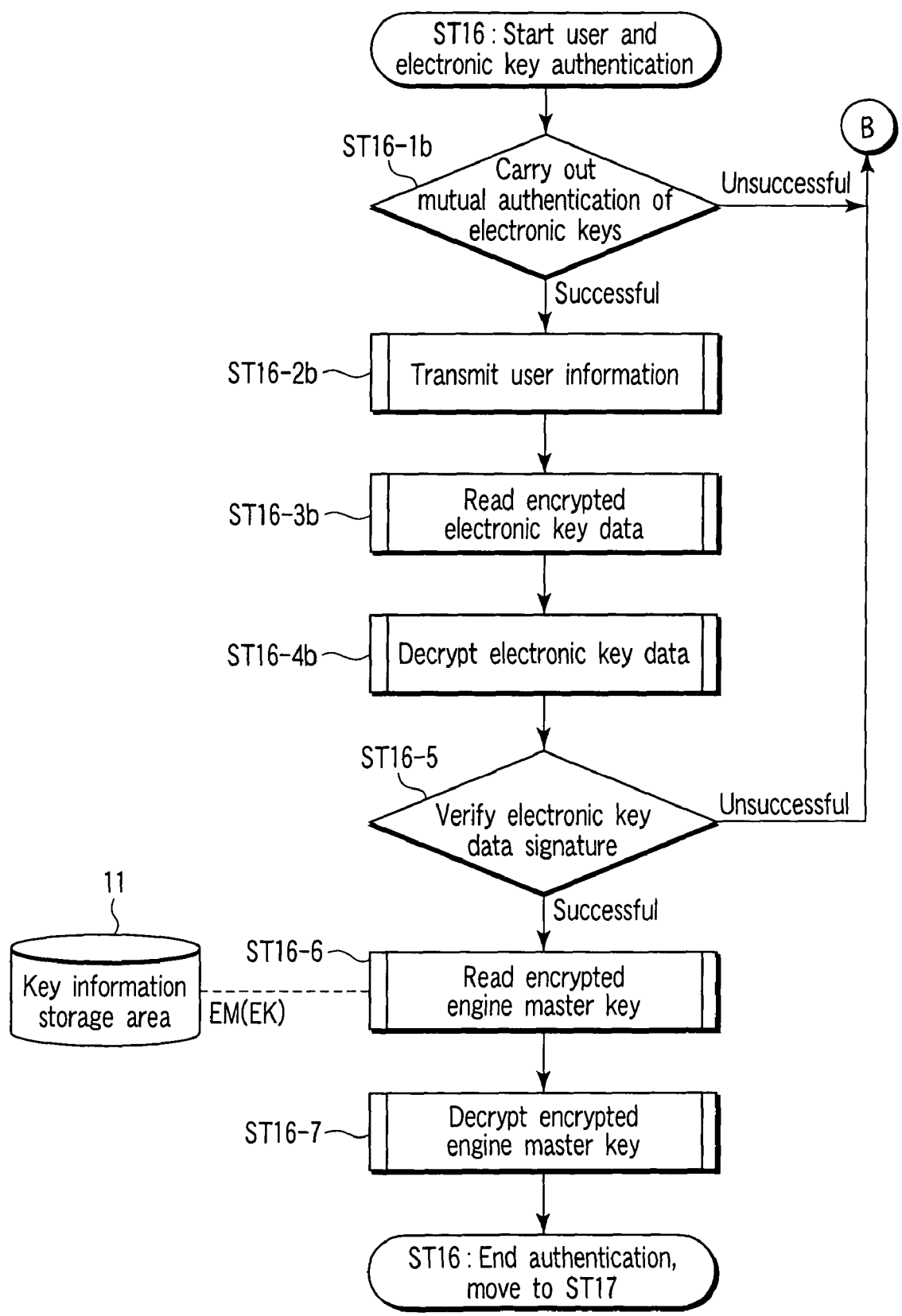
Figure 11:
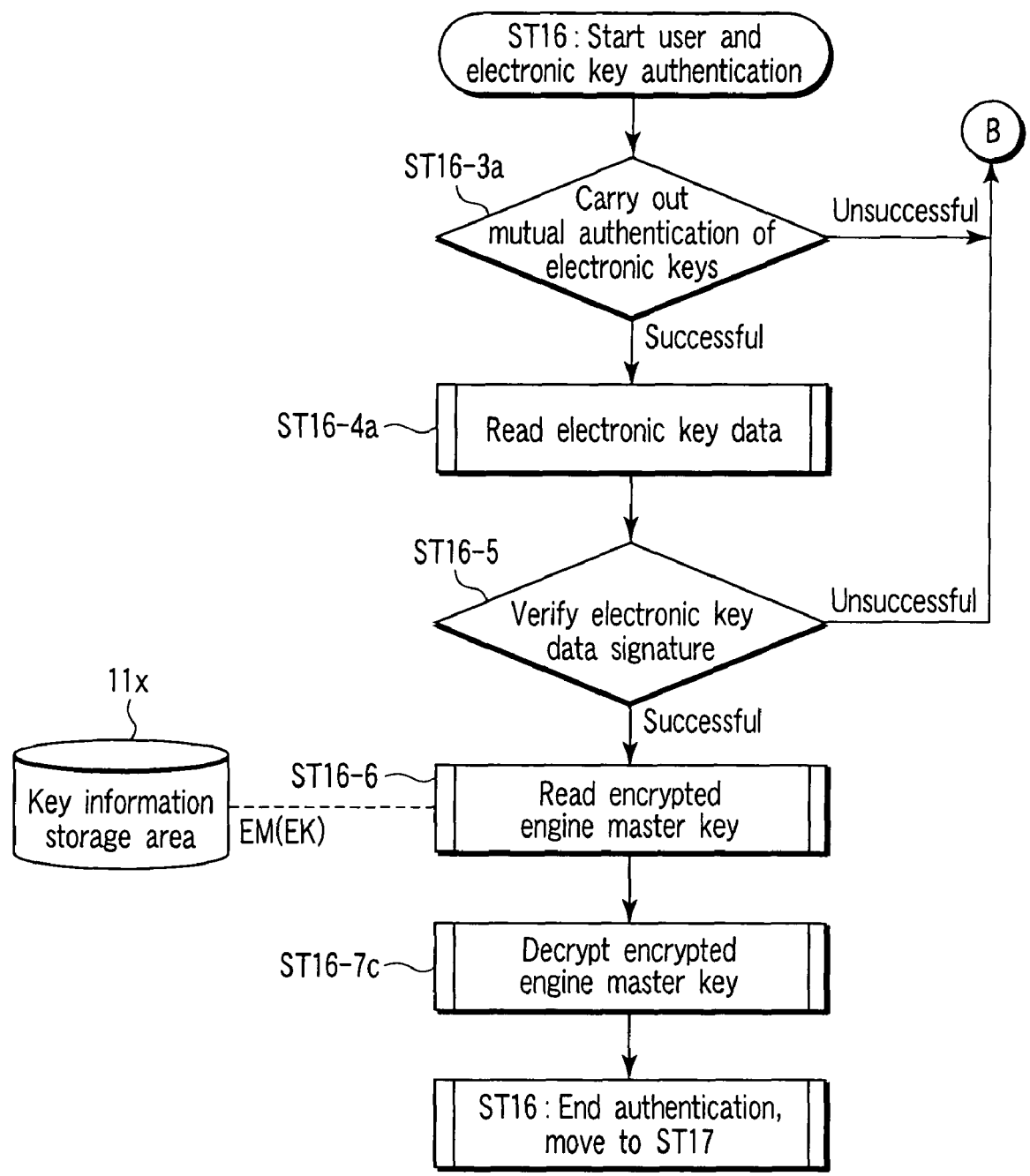

A program storage area 15x stores a program for a computing section 17 to execute a processing operation shown in either a set of FIGS. 7 and 8 and a set of FIGS. 9 to 11, instead of the program described previously.

A private key information storage area 18 is provided as an area for storing in advance an electronic key data signature generating key SMK of an owner (purchaser) from a vehicle manufacturer. The electronic key data signature generating key SMK is provided as a key for producing a signature of electronic key data K. This private key information storage area 18 can be read by using only the hash key MI contained in the owner's ID card 5M.

Now, an operation of the vehicle authenticating device configured above will be described with reference to flowcharts shown in FIGS. 7 to 11.

(Whole Operation)

As shown in FIGS. 7 and 8, when an owner registers a new user and issues a new key, there are prepared the owner's electronic key 2M, an ID card 5M, and a registration ID card 5r of a user to be newly registered.

The owner exhibits the ID card 5M to an ID card reader 4 when getting in a vehicle.

A security device 10x reads a certificate MC from the ID card 5M through this ID card reader 4 (ST11).

The security device 10x verifies validity of the certificate MC by using an ID card certificate verification key MCK contained in a certificate information storage area 14x in order to verify the ID card 5M (ST12).

In the case where validity verification has failed (ST12: NO), the security device 10x judges that the card is not an ID card issued from a valid organization, and then, processing reverts to step ST11.

In the case where validity verification has been successfully made (ST12: NO), the security device 10x judges that the card is an ID card issued from a valid organization, and then, prompts input of user information from a display panel or the like (not shown) of an input and output section 16x.

The owner inputs owner authentication information OP (biometric authentication information such as a fingerprint, or a PIN) for reading the user information contained in the ID card 5M. In this manner, the owner authentication information OP is input to the security device 10x (ST13).

The security device 10x transmits this user authentication information OP to the ID card 5M through the ID card reader 4, and causes the ID card 5M to verify authentication information (ST14).

In the case where verification of the authentication information has failed (ST14: Unsuccessful), it is judged that the owner is an invalid owner, a result indicative of the failure is returned to the security device 10x, and then, processing reverts to step ST11.

In the case where verification of the authentication information has been successfully made (ST14: Successful), it is judged that the owner is a valid owner, ID card 5M returns a hash key MI to the security device 10x, and then, the security device 10x reads the hash key MI (ST15).

Next, the security device 10x carries out authentication of an owner and an electronic key by using an electronic key 2M (ST16), and then, decrypts an encrypted engine master key EM (EK) stored in a key information storage area 11x together with this authentication. A detailed description of this step ST16 will be given later with reference to FIGS. 9 to 11.

In the case where authentication has failed (ST16: Unsuccessful), it is judged that the owner is an invalid owner of the electronic key 2M, and then, processing reverts to step ST11.

In the case where authentication has been successfully made (ST16: Successful), it is judged that the owner is a valid owner of the electronic key 2M, and then, the security device 10x prompts the owner to exhibit a registration ID card 5r. The owner exhibits the registration ID card 5r to the registration ID card reader 4r.

The security device 10x reads a certificate C from the ID card 5r through the registration ID card reader 4r (ST17).

The security device 10x verifies validity of the certificate C by using the ID card certificate verification key CK contained in the certificate information storage area 14x in order to verify the ID card 5r (ST18).

In the case where validity verification has failed (ST18: NO), the security device 10x judges that the ID card is not an ID card issued from a valid organization, and processing reverts to step ST11.

In the case where validity verification has been successfully made (ST18: YES), the security device 10x judges that the card is an ID card issued from a valid organization, and processing goes to the next step.

The next step corresponds to step ST19 in the case where the details on step ST16 described previously are as shown in FIG. 10 or FIG. 11. In addition, it corresponds to step ST22 in which the details on step ST16 are as shown in FIG. 9.

In step ST19, an owner, in the witness of a user, inputs the user authentication information P (biometric authentication information such as a fingerprint, and PIN) for the user to read the user information contained in the registration ID card 5r through the user information input device 3. In this manner, the user authentication information P is input to the security device 10x (ST19).

The security device 10x transmits this user authentication information P to the registration ID card 5r through the registration ID card reader 4r, and causes the registration ID card 5r to verify authentication information (ST20).

In the case where verification of authentication information has failed (ST20: Unsuccessful), it is judged that the user is an invalid user, a result indicative of the failure is returned to the security device 10x, and then, processing reverts to step ST11.

In the case where verification of authentication information has been successfully made (ST20: Successful), it is judged that the user is a valid user, the ID card 5r returns the hash key I to the security device 10x, and then, the security device 10x reads the hash key I (ST21).

Next, the security device 10x reads an electric key data signature generating key SMK contained in a private key information storage area 18 by using the hashed key MI read in step ST15, and then, generates new electronic key data K by using this key SMK (ST22).

In addition, in the case where the electronic key data signature generating key SMK is stored in the electronic key 2M, the security device 10x transmits the hash key MI read in step ST15 to an electronic key 2M, and then, the electronic key 2M generates electronic key data K and returns the generated data to the security device 10x.

In the case where the details on step ST16 are as shown in FIG. 10, the security device 10x encrypts the electronic key data K, and then, generates the encrypted electronic key data E (K), by using the hash key I read in step ST21.

Then, the owner mounts the provided new electronic key 2r on an electronic key registering device 1r.

In this manner, the security device 10x carries out mutual authentication with the electronic key 2r via the electronic key registering device 1r (ST23). In mutual authentication, there are used: an electronic key communication key KK contained in a key information storage area 11x of the security device 10x; and an electronic key communication key KK contained in the electronic key 2r.

In the case where mutual authentication has failed (ST23: Unsuccessful), it is judged that at least one of the devices is an invalid device, and then, processing reverts to step ST11. In the case where mutual authentication has been successfully made (ST23: Successful), it is judged that both of the devices are valid devices. Then, the security device 10x transmits the electronic key data K or the encrypted electronic key data E (K) to the electronic key 2r, and then, the electronic key 2r stores the received electronic key data in a tamperproof area (ST24).

Subsequently, in step ST25, the following processing operations are executed in the case where the details on step ST16 are as shown in FIG. 9, FIG. 10, or FIG. 11.

In the case where the details on step ST16 are as shown in FIG. 9, the security device 10x encrypts an engine master key EK decrypted in the security device 10x by using the electronic key data K, and then, registers the encrypted engine master key E (EK) in the key information storage area 11x.

In addition, in the case where the details on step ST16 are as shown in FIG. 10, the security device 10x encrypts an engine master key EK decrypted in the security device 10x by using the electronic key data K, and then, registers the encrypted engine master key E (EK) in the key information storage area 11x.

In the case where the details on step ST16 are as shown in FIG. 11, the security device 10x encrypts the engine master key EK decrypted in the security device 10x, and then, registers the encrypted engine master key E (EK) in the key information storage area 11x, by using the hash key I and the electronic key data K read in step ST21.

Now, registration of the electronic key 2r has been completed. In the case where the details on step ST16 are as shown in FIG. 9, the security device 10x can carry out registration of the hash key I into a user information storage area 12 at an arbitrary timing without being limited to a timing identical to that of key issuance prior to use.

(First Specific Example of ST16: User and Electronic Key Authentication)

Now, three specific examples of step ST16 will be described with reference to FIGS. 9 to 11.

FIG. 9 is a flowchart showing a first specific example of step ST16. The contents of the processing operations are identical to those shown in FIG. 3 described previously.

That is, a security device 10x matches an owner's hash key MI (ST16-1a), and carries out mutual authentication with an electronic key 2M (ST16-3a). In addition, the security device 10x reads electronic key data MK (ST16-4), verifies a signature of the electronic key data MK by using an electronic key data signature verification key VTK (ST16-5), and then, reads an encrypted engine master key EM (EK) (ST16-6). In addition, the security device 10x decrypts an encrypted engine master key EM (EK) by using the electronic key data MK (ST7-7), and obtains an engine master key EK.

(Second Specific Example of ST16: User and Electronic Key Authentication)

FIG. 10 is a flowchart showing a second specific example of step ST16. The contents of the processing operations are identical to those shown in FIG. 4 described previously.

That is, electronic key data MK is stored in an electronic key 2M in a state in which the data has been encrypted by using a hash key MI.

The security device 10x carries out mutual authentication with the electronic key 2M (ST16-1b), transmits the hash key MI to the electronic key 2 (ST16-2b), and reads encrypted electronic key data E (MK) (ST16-3b). In addition, the security device 10x decrypts the encrypted electronic key data E (MK) by means of the hash key MI, and obtains electronic key data MK (ST16-4b). Subsequently, steps ST7-5 to ST7-7 are executed in the same manner as that described previously.

(Third Specific Example of ST16: User and Electronic Key Authentication)

FIG. 11 is a flowchart showing a third specific example of step ST16. The contents of the processing operations are identical to those shown in FIG. 5 described previously.

That is, an encrypted engine master key EM (EK) is encrypted by using a hash key MI and electronic key data MK.

As shown in FIG. 11, steps ST16-1a and ST16-2a shown in FIG. 9 are eliminated, and steps ST16-3a to ST16-6 shown in FIG. 9 are executed in the same manner as that described previously.

Subsequently, the security device 10x decrypts an encrypted engine master key EM (EK) (ST16-7c), and obtains an engine master key EK, by using the user's hash key MI and electronic key data MK read in step ST15 described previously.

(Processing Operation for Revoking Electronic Key)

Now, a technique for revoking an electronic key will be described here.

In the case of revoking an individual user's electronic key K, the user's hash key I and the user's encrypted engine master key E (EK) are deleted, the hash key and engine master key being stored in the user information storage area 12 and the key information storage area 11 shown in FIG. 1. In this manner, the electronic key K of this user can be revoked, making it impossible to use a vehicle by this electronic key K.

In the case of revoking issued electronic keys K of all of the users, such revocation is carried out as follows.

An owner's electronic key data signature generating key SMK and an electronic key data signature verification key VMK are a pair of keys in a public key encrypting system, and a public key certificate issued from a vehicle manufacturer is assigned to the electronic key data signature verification key VMK. Therefore, this public key certificate is revoked by a vehicle manufacturer, and then, a revocation list disclosed through a network is received through a communication device 6 shown in FIG. 1. Here, in step ST7-5 shown in each of FIGS. 3, 4, and 5, a verification is made as to whether or not the public key certificate assigned to the electronic key data signature verification key VMK is a public key certificate described in this revocation list. If the assigned certificate is the revoked public key certificate, it is judged that signature verification has failed. In this manner, the electronic key K can be revoked, making it impossible to use a vehicle by the electronic keys of all the users.

In addition, similarly, an electronic key data signature generating key STK and an electronic key data signature verification key VTK of a vehicle manufacture are a pair of keys in a public key encrypting system, and a public key certificate issued from an authorized organization such as motor vehicle bureau is assigned to the electronic key data signature verification key VTK. Therefore, at the time of discarding a vehicle, this public key certificate is revoked by an authorized organization such as motor vehicle bureau, and a revocation list disclosed through a network is received through a communication device 6 shown in FIG. 6. Here, in step ST7-5 shown in FIG. 3, FIG. 4, or FIG. 5, a verification is made as to whether or not the public key certificate assigned to the electronic key data signature verification key VTK is a public key certificate described in this revocation list. If the above certificate is the revoked public key certificate, it is judged that signature verification has failed. In thus manner, the electronic key MK can be revoked, making it impossible to issue an electronic key of a vehicle by this electronic key MK.

As described above, according to the present embodiment, an electronic key MK for issuing the user's electronic key 2r is prepared, making it possible to issue an electronic key for using a vehicle only when this electronic key MK is also used together with the owner's ID card 2M similarly. Thus, even in a situation in which a dealer and a criminal are in close liaison with each other, vehicle theft by the criminal can be prevented as much as possible.

In addition, in the case where a plurality of users use a vehicle, an electronic key is newly issued for each user without producing a duplicate electronic key, making it possible to use a vehicle. In addition, an electronic key is revoked for each user, making it impossible to use a vehicle. In this manner, the use of a vehicle is enabled or disabled for each user. Thus, a theft at the time of car rental can be prevented while in operation such as car rental, enabling safe vehicle rental.

In addition, in the case where the corresponding vehicle cannot be used because of an environmental problem, the electronic keys of all the users and owners are revoked, thereby making it impossible to use a vehicle and to newly issue a user's electronic key. Therefore, it becomes possible to promote taking procedures for discarding a vehicle and to eliminate illegal vehicles from a public road.

In addition, in vehicle transfer including sales and resale, the use of a vehicle key (electronic key) by a transferor is revoked, and a vehicle key (electronic key) transferred to the transferee can be validated to be associated with the transferee, and the safety relevant to a vehicle theft can be improved.

In addition to the advantageous effect as described above, the user and electronic key authentication of step ST16 can attain an advantageous effect similar to those shown in FIGS. 3 to 5 described previously in each of the specific examples shown in FIGS. 9 and 10.

Third Embodiment

Figure 12:
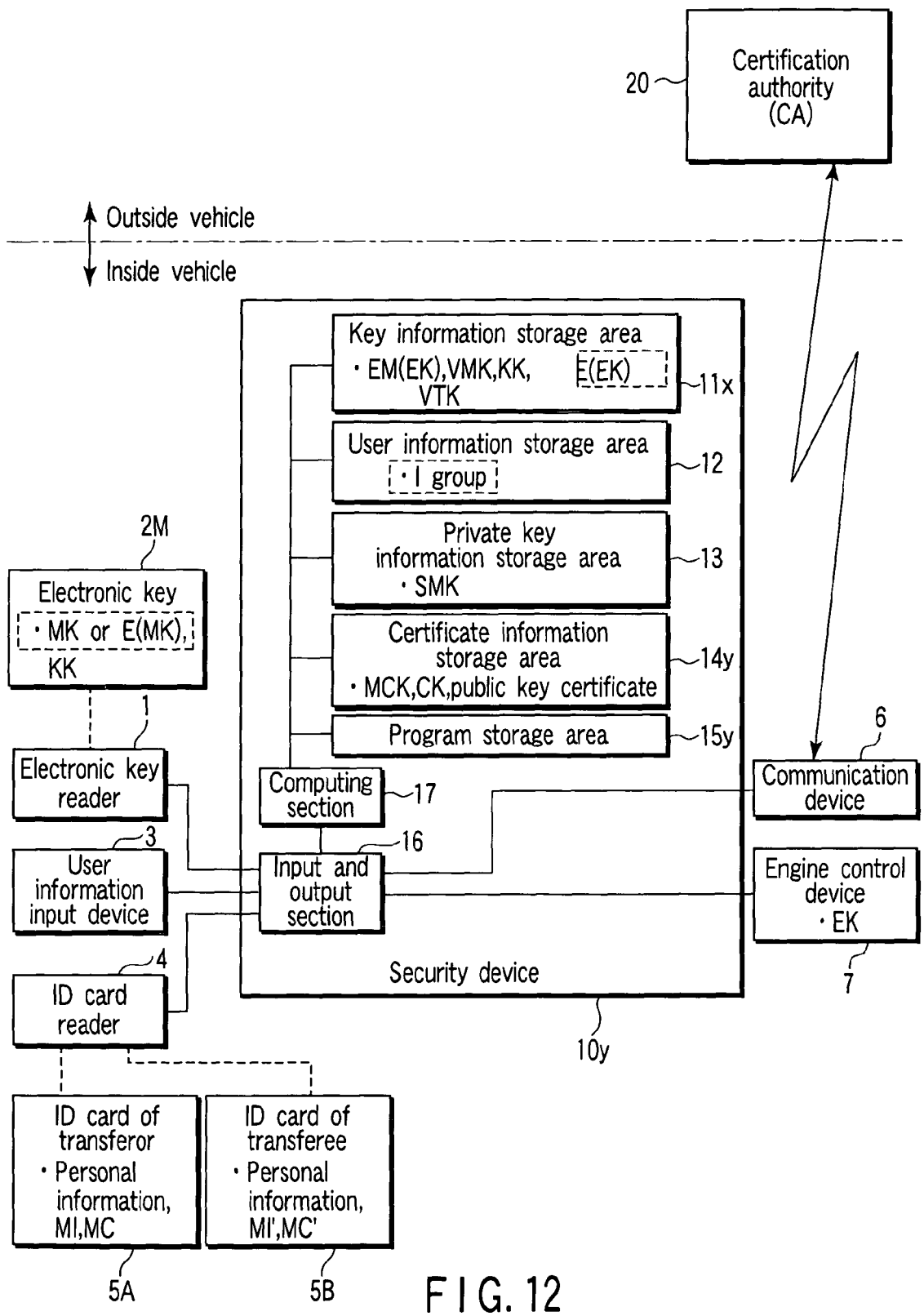
FIG. 12 is a schematic view depicting a configuration of an electronic key system according to a third embodiment of the present invention.

FIG. 12 is a block diagram depicting a configuration of a vehicle authenticating device according to a third embodiment of the present invention. That is, the present invention is provided as a modified example of the second embodiment, in which a certification authority 20 and a communication device 6 capable of communicating with each other are provided. In addition, a registration electronic key registering device 1r and a registration ID card reader 4r are eliminated, respectively, and one electronic key reader 1 and one ID card reader 4 are used in all cases for simplicity.

Here, the certification authority 20 may be managed by a vehicle manufacturer or may be managed by an organization which integrally manages a vehicle such as motor vehicle bureau. In any case, this certification authority is assumed to be managed by a widely reliable organization.

In addition, a certificate information storage area 14y stores: a CA public key certificate; a public key certificate of an electronic key data signature verification key VTK for verifying a signature generated by the certification authority 20; and a public key certificate of an electronic key data signature verification key VMK, in addition to the verification keys MCK and CK described above. However, the public key certificate of the electronic key data signature verification key VTK and the public key certificate of the electronic key data signature verification key VMK may be stored in a key information storage area 11x, as in the second embodiment. In addition, the certificate information storage area 14y can store revocation lists of the public key certificates.

Figure 13:
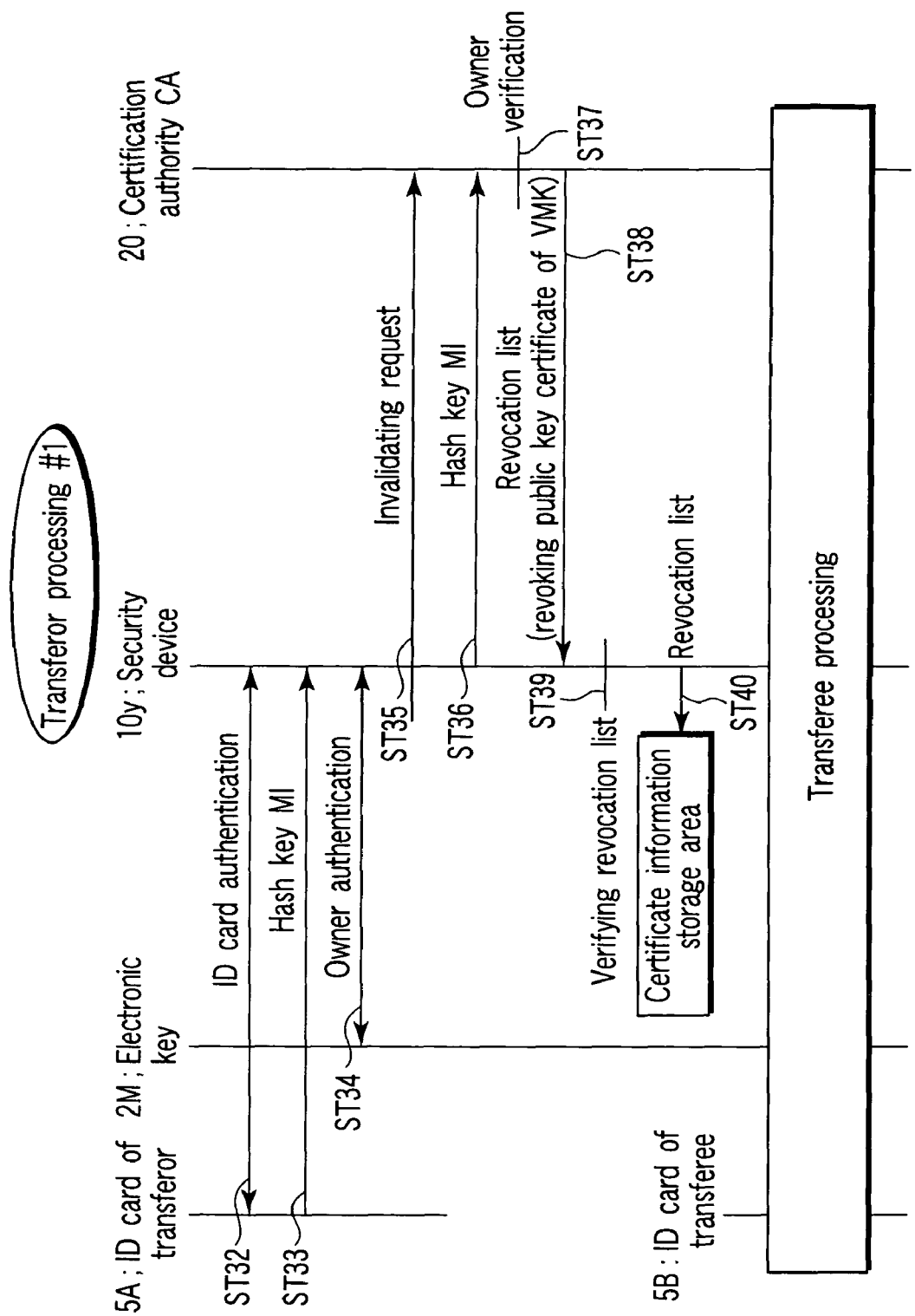
FIGS. 13 and 14 are sequence charts for explaining an operation in the present embodiment.
Figure 14:
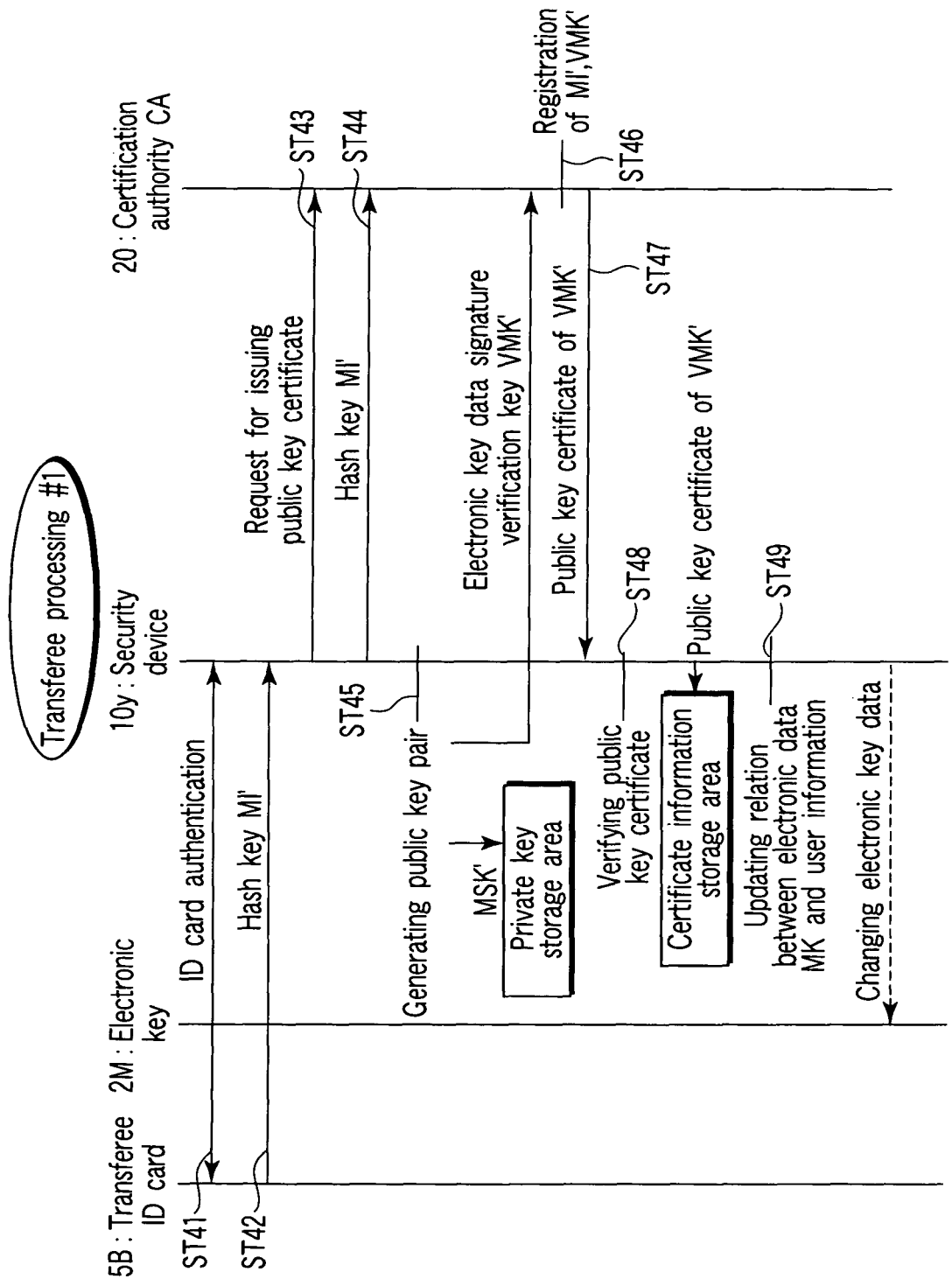

A program storage area 15y stores a program for a computing section 17 to execute the processing operations shown in FIGS. 13 and 14, instead of the program described previously. This program is assumed to execute the processing operations shown in FIGS. 15 to 18 in embodiments described later.

Now, an operation of the vehicle authenticating device configured above will be described in detail with reference to sequence charts shown in FIGS. 13 and 14.

At the time of transferring a vehicle, an electronic key 2M is transferred in accordance with procedures below. At this time, there are used an ID card 5A of a transferor (an owner before transfer) and an ID card 5B of a transferee (an owner after transfer).

First, as shown in FIG. 13, a security device 10y authenticates the ID card 5A of the transferor (ST32), and then, acquires a hash key MI of the transferor from the ID card 5A (ST33).

In addition, the security device 10y authenticates the transferor and the electronic key in accordance with any of techniques shown in FIGS. 9 to 11 (ST34), and decrypts an encrypted engine master key EM (EK) stored in the key information storage area 11x as a result of this authentication.

Then, the security device 10y requests the certification authority 20 to revoke the transferor via a communication device 6 (ST35), and then, transmits a hash key MI of the transferor (ST36).

The certification authority 20 verifies that the hash key MI is the transferor's hash key registered in advance (ST37). When the verification has been successfully made, a revocation list of public key certificates revoking the public key certificate of the electronic key signature verification key VMK issued to the transferor is returned to the security device 10y (ST38).

The security device 10y verifies the validity of the revocation list by using the electronic key data signature verification key VTK contained in the certificate information storage area 14y (ST39). When the validity is confirmed, the revocation list is stored in the certificate information storage area 14y (ST40).

Next, the security device 10y, as shown in FIG. 14, authenticates an ID card 5B of the transferee (ST41), and then, acquires a hash key MI' of the transferee from the ID card 5B (ST42). Then, the security device 10y requests the certification authority 20 to issue a new public key certificate via the communication device 6 (ST43), and then, transmits the hash key MI' (ST44).

In addition, a public key pair is generated in the security device 10y (ST45); the private key is stored as an electronic key data signature generating key SMK' in a private key storage area 18; and the public key is transmitted as an electronic key data signature verification key VMK' to the certification authority 20.

The certification authority 20 registers the hash key MI' and the electronic key data signature verification key VMK' as new owner information (ST46); issues a public key certificate of the electronic key data signature verification key VMK'; and returns this public key certificate to the security device 10y (ST47).

The security device 10y verifies the validity of the received public key certificate of VMK' by using the electronic key data signature verification key VTK contained in the certificate information storage area 14y (ST48). When the validity is confirmed, the certificate is stored in the certificate information storage area 14y.

Next, the security device 10y updates the relation between the encrypted engine master key EM (EK) contained in the key information storage area 11x, the electronic key data MK contained in the electronic key 2M, and the hash key MI' of the transferee (ST49).

Here, step ST49 is determined depending on which case of FIGS. 9 to 11 to execute step ST34 described previously.

In the case of the above step as shown in FIG. 9, step ST49 updates the hash key MI of the transferor stored in advance in the user information storage area 12 to the hash key MI' of the transferee.

In the case of the above step as shown in FIG. 10, The encrypted electronic key data E(MK) encrypted by using the hash key MI of the transferor contained in the electronic key 2M is replaced with the encrypted electronic key data E(MK) encrypted by using the hash key MI' of the transferee.

In the case of the above step as shown in FIG. 11, the encrypted engine master key EM(EK) encrypted by using the hash key MI of the transferor and the electronic key data MK stored in the key information storage area 11x is replaced with the encrypted engine master key EM(EK) encrypted by using the hash key MI' of the transferee and the electronic key data MK.

After the above step has been executed, the electronic key 2M is transferred from the transferor to the transferee. In this manner, the user's electronic key registered by the transferor becomes unavailable and the transferor cannot use the electronic key 2M transferred to the transferee.

As described above, according to the present embodiment, the electronic key 2M can be safely transferred with a configuration for the certification authority 20 to issue a revocation list and a new public key certificate.

Fourth Embodiment

Now, a fourth embodiment of the present invention will be described here.

Figure 16:
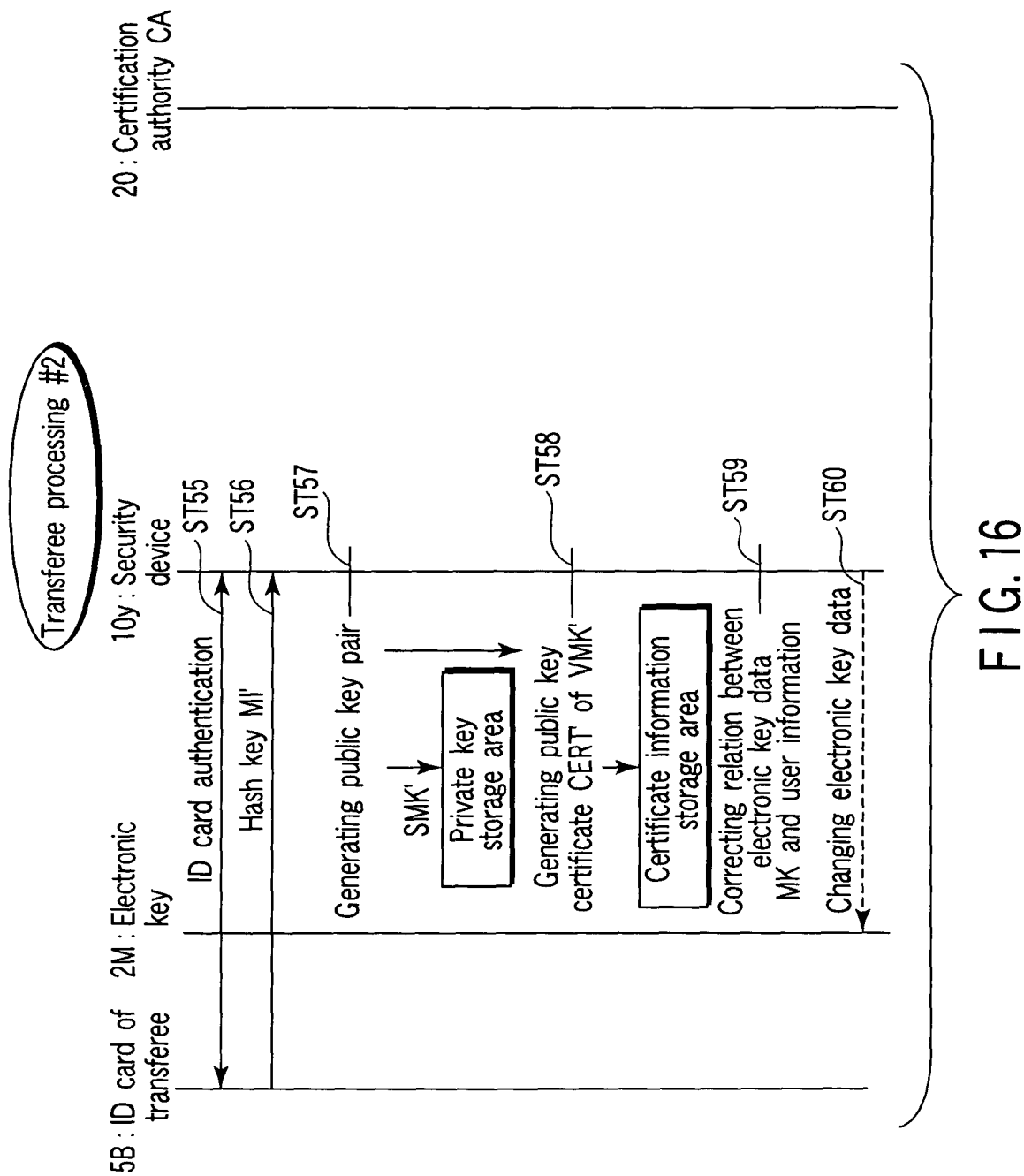
FIGS. 16 and 17 are sequence charts for explaining the present embodiment.
Figure 17:
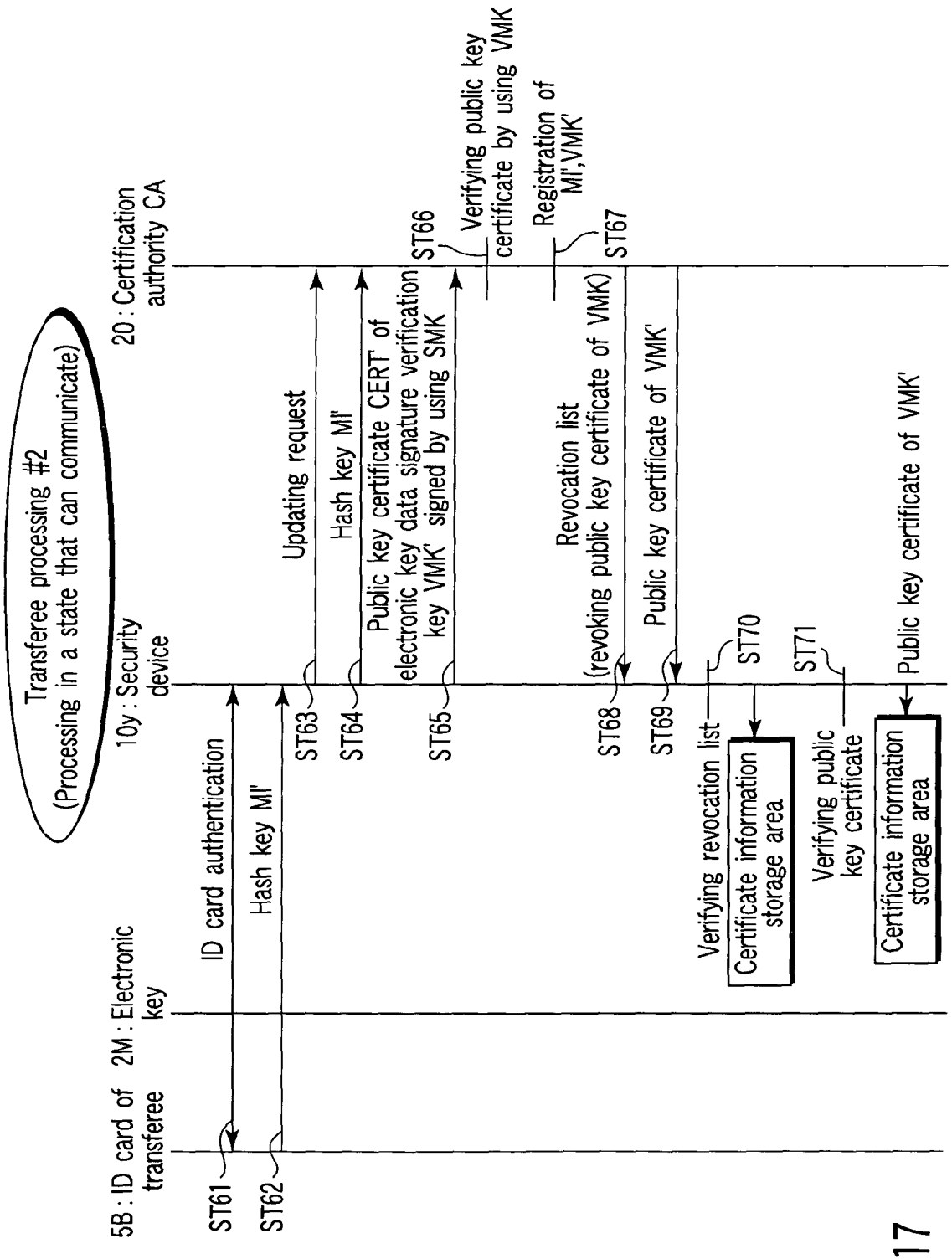

With reference to FIGS. 15 to 17, the present embodiment describes in detail an example of transfer of an electronic key without making communication, which is applicable even if communication cannot be made temporarily between a certification authority 20 and a vehicle.

At the time of transfer of an electronic key, a situation in which communication can be made is not always established. For example, there is a possibility that communication cannot be made in the case where a vehicle shop is located indoor or underground. In this case, in the third embodiment, there is a need for the shop to additionally prepare equipment for making communication or a need to put out the vehicle to outside temporarily, and inconvenience in carrying out communication or a cost on facility investment occurs. In addition, in the case where the certification authority 20 is temporarily down due to maintenance or the like, there occurs a situation in which transfer of an electronic key is disabled. Consequently, the system is imperfect. In addition, even in a situation in which communication can be made, processing with communication makes a load such as a communication delay. Thus, it is desirable that this transfer can be carried out without making communication.

In order to meet these demands, the present invention enables transfer of an electronic key 2M without making communication. Then, when communication is enabled after transfer and an access can be provided to an ID card 5B of a transferee, for example, while the vehicle runs, the vehicle makes communication with the certification authority 20 automatically and obtains information same as that in the third embodiment.

First, as in steps ST32 to ST34 described previously, authentication of an ID card 5A (ST52), acquisition of a hash key MI of a transferor (ST53), and authentication of the transferor and electronic key as shown in any one of FIGS. 9 to 11 (ST54) are carried out. As a result of this authentication, the encrypted engine master key EM (EK) in a key information storage area 11x is decrypted.

Next, as shown in FIG. 16, a security device 10y authenticates an ID card 5B of a transferee (ST55), and then, acquires a hash key MI' of the transferee (ST56), as in steps ST41 and ST42 described previously.

Then, the security device 10y generates a pair of public keys therein (ST57), and then, stores the private key as an electronic key data signature generating key SMK' in a private key storage area 18.

On the other hand, the security device 10y defines the public key as an electronic key data signature verification key VMK'; generates a public key certificate CERT' of VMK' signed by using an electronic key data signature generating key SMK of the transferor stored in the private key information storage area 18 (S58); and stores the public key certificate CERT' in the certificate information storage area 14y.

Subsequently, verification of the signature generated by using the electronic key data signature generating key SMK' is made by using the public key in the certificate CERT'.

Lastly, as in step ST49 described previously, the security device 10y updates the relation between the electronic key data MK contained in an electronic key 2M, the encrypted engine master key EM (EK) contained in the key information storage area and the hash key MI' of the transferee (ST59 and ST60).

Next, as shown in FIG. 17, when an access can be provided to the ID card 5B of the transferee and communication can be made, for example, while the vehicle runs, the security device 10y automatically makes communication with the certification authority 20. Here, there is shown procedures for updating the public key certificate of the electronic key data signature verification key VMK' to a public key certificate same as that in the third embodiment.

First, the security device 10y authenticates the ID card 5B of a transferee (ST61), and then, acquires the hash key MI' of a transferee (ST62).

Then, the security device 10y transmits an update request and the hash key MI' of the transferee to the certification authority 20 (ST63 and ST64). Further, the security device 10y transmits the public key certificate CERT' of VMK' to the certification authority 20 (ST65).

The certification authority 20 verifies that the public key certificate CERT' is reliably generated by using the electronic key data signature generating key SMK of a transferor by using an electronic key data signature verification key VMK of a transferor registered previously (ST66).

In the case where the verification has been successfully made, the certification authority 20 registers the hash key MI' and the electronic key data signature verification key VMK' as new owner information (ST67), and then, returns to the security device 10y a revocation list of public certificates revoking the public key certificate of the electronic key signature verification key VMK issued to the transferor (ST68).

At the same time, a public key certificate of electronic key data signature verification key VMK' of the transferee is generated, and the generated certificate is returned to the security device 10y (ST69).

The security device 10y verifies validity of the revocation list by using the electronic key data signature verification key VTK contained in the certificate information storage area 14y. If the validity is confirmed, the security device 10y stores the revocation list in the certificate information storage area 14y.

At the same time, the security device 10y verifies validity of the public key certificate of the electronic key data signature verification key VMK' by using the electronic key data signature verification key VTM contained in the certificate information storage area 14y. If the validity is confirmed, this security device 10y stores the public key certificate in the certificate information storage area 14y.

In accordance with the procedures described above, the security device 10y and the certification authority 20 can obtain information same as that in the third embodiment even if communication is temporarily interrupted.

Fifth Embodiment

Now, a fifth embodiment of the present invention will be described here.

With reference to FIG. 18, the present embodiment describes in detail an example in which, even in the case where an owner has lost an electronic key 2M, a new electronic key can be reissued by means of communication with a certification authority 20.

First, a security device 10y authenticates an ID card 5M of an owner (ST72), and then, acquires a hash key MI of the owner from the ID card 5M (ST73).

Next, the security device 10y requests the certification authority 20 to reissue an electronic key (ST74) and transmits the owner's hash key MI (ST75).

The certification authority 20 verifies that the hash key MI is the owner's hash key registered in advance (ST76). When the verification has been successfully made, the certification authority generates a new masker key MK' which is different from the master key MK included in the lost electronic keys, and then, returns the following information to the security device 10y (ST77 and ST78).

Here, steps ST77 and ST78 are different from each other depending on which case as shown in FIGS. 9 to 11 corresponds to owner and electronic key authentications.

In the case of the above steps as shown in FIG. 9, the certification authority 20 returns to the security device 10y the new master key MK' and an encrypted engine master key EM (EK)' encrypted by using the new master key MK'.

In the case of the above steps as shown in FIG. 10, the certification authority 20 returns to the security device 10y the new master key MK' encrypted by the owner's hash key MI and the encrypted engine master key EM (EK)' encrypted by using the new master key MK'.

In the case of the above steps as shown in FIG. 11, the certification authority 20 returns to the security device 10y the new master key MK' and the engine master key EM (EK)' encrypted by using the new master key MK' and the owner's hash key MI.

Next, the security device 10y carries out mutual authentication with a new electronic key 2r by using the electronic key communication key KK stored in the key information storage area 11x (ST79), and then, stores in a tamperproof area contained in the electronic key 2r the new engine master key MK' or the encrypted new master key MK' received from the certification authority 20 (ST80).

At the same time, the encrypted engine master key stored in the key information storage area 11x is replaced with the encrypted engine master key EM (EK)' received from the certification authority 20 (ST81).

In accordance with the procedures described above, it becomes impossible to utilize the lost electronic keys, and a new electronic key can be used. In addition, an electronic key of a user registered in advance can be used without making any change.

The techniques described in the embodiments can be partly stored, as programs that can be executed by a computer, in storage media such as a magnetic disk (floppy (registered trade mark) disk, hard disk, or the like), an optical disk (CD-ROM, DVD, or the like), a magneto-optic disk (MO), or a semiconductor memory.

The storage media may be in any form provided that it can store programs and can be read by the computer.

An operating system (OS) or middleware such as database management software or network software may execute part of the processes required to implement the present embodiment; the OS operates on the computer on the basis of instructions from a program installed in the computer.

The storage media according to the present invention is not limited to media independent of the computer but includes storage media in which programs transmitted over the Internet or the like are permanently or temporarily stored by downloading.

The number of storage media is not limited to one. The storage media according to the present invention includes the execution of the process according to the present embodiment from a plurality of media. The media may be arbitrarily configured.

The computer according to the present invention executes the processes according to the present embodiment on the basis of the programs stored in the storage media. The computer may be arbitrarily configured; it may comprise one apparatus similarly to a personal computer or may be a system in which a plurality of apparatuses are connected together via a network.

The computer according to the present invention is not limited to a personal computer but includes an arithmetic processing apparatus, a microcomputer, or the like contained in information processing equipment. The computer is a general term for equipment and apparatuses that can realize the functions of the present invention using programs.

The present invention is not limited to the as-described embodiments. In implementation, the present invention can be embodied by varying the components of the embodiments without departing from the spirit of the present invention. Further, various inventions can be formed by appropriately combining a plurality of the components disclosed in the embodiments. For example, some of the components shown in the embodiments may be omitted. Moreover, components of different embodiments may be appropriately combined together.

According to the present invention, a vehicle theft can be prevented even when electronic key data or an electronic key device has been copied.

What is claimed is:

1. A security device for use in a vehicle authenticating device which is mounted on a vehicle capable of running in accordance with engine startup information and which authenticates a user of the vehicle based on an electronic key device having electronic key data (K) stored therein, the security device comprising:

key information storage device for storing an encrypted engine master key (E (EK)) obtained by encrypting an engine master key (EK) in accordance with the electronic key data (K);

certificate information storage device having an ID device certificate verification key (CK) to verify a certificate (C) in an ID device having a personal information for specifying an individual user, the certificate (C), and a user specific key (I) stored therein;

a device for verifying the certificate (C) input from the ID device by using the IC device certificate verification key (CK) in the certificate information storage device to confirm validity of the ID device;

a device for, after confirming the validity of the ID device, causing the ID device to verify user inputted authentication information by transmitting the user inputted authentication information to the ID device, the ID device verifying the user inputted authentication information based on the personal information;

a signature verification key storage device storing an electronic key data signature verification key (VMK) to verify a digital signature applied to an electronic key data (K);

an authentication device for, when a verification result by the ID device has been successfully obtained, authenticating the digital signature of the electronic key data (K) based on the electronic key data signature verification key (VMK), the electronic key data (K) inputting from the electronic key device;

a device for, when authentications of the digital signature of the electronic key data (K) have been successfully made, decrypting the encrypted engine master key (E (EK)), and then, obtaining an engine master key (EK), based on the electronic key data (K);

a device for producing the engine startup information by using the engine master key (EK); and a device for outputting the obtained engine startup information.

2. The security device according to claim 1, comprising:

user information storage device for storing a group of user specific keys (I) made of a plurality of user specific keys (I);

wherein the authentication device comprises:

a device for matching the user specific keys (I) input from the ID device and the group of the user specific keys (I);

a device for, when a coincident user specific key (I) exists as a result of this matching, storing the electronic key data (K) input from the electronic key device; and a device for verifying the digital signature of the electronic key data (K) based on the electronic key data signature verification key (VMK) in the signature verification key storage device.

3. The security device according to claim 1, wherein the electronic key data (K) is stored in an electronic key device in a state in which the data has been encrypted by using the user specific keys (I); and the authentication device for comprises:

a device for reading the encrypted electronic key data (E (K)) from the electronic key device;

a device for decrypting the encrypted electronic key data (E (K)) by device of the user specific keys (I), thereby obtaining electronic key data (K); and a device for verifying the digital signature of the electronic key data (K) based on the electronic key data signature verification key (VMK) in the signature verification key storage device.

4. The security device according to claim 1, wherein the encrypted engine master key (E (EK)) is stored in the key information storage device in a state in which the key has been encrypted by using the electronic key data (K) and the user specific keys (I);

the authentication device comprises:

a device for storing the electronic key data (K) input from the electronic key device; and a device for verifying the digital signature of the electronic key data (K) based on the electronic key data signature verification key (VMK) in the signature verification key storage device; and the device for obtaining the engine master key (EK) decrypts the encrypted engine master key (E (EK)) based on the electronic key data (K) and the user specific keys (I), when authentication of the digital signature of the electronic key data (K) has been successfully made.

5. The security device according to claim 1, comprising:
a private key information storage device for storing an electronic key data signature generating key (SMK) to generate new electronic key data (K);
an owner authenticating device for allowing control by an owner of the vehicle and an ID device of the owner to execute the device for confirming validity of the ID device, the device for causing the ID device to verify the user authentication information, the device for storing the input user specific key (I), and the authentication device;
a registrant authentication device for, when authentication of the digital signature of the electronic key data (K) has been successfully made by the owner authenticating device, making control with respect to a registrant and an ID device of the registrant, so as to execute the device for confirming validity of the ID device, the device for causing the ID device to verify the user authentication information, and the device for storing the input user specific keys (I);
a device for, after execution of the registrant authenticating device has been completed, generating new electronic key data in accordance with the electronic key data signature generating key (SMK); and
a device for inputting the new electronic key data to an electronic key device of a registrant.

6. The security device according to claim 1, wherein
the electronic key data (K) has a digital signature applied by a certification authority;
the electronic key data signature verification key (VMK) becomes effective by a public key certificate of the certification authority;
the public key certificate of the certification authority is revoked in accordance with a revocation list of the certification authority; and
the security device comprises:
a device for, when the electronic key device is transferred, requesting the certification authority to revoke a public key certificate before transfer; and
a device for, when transfer of the electronic key device is received, requesting the certification authority to issue a new public key certificate.

7. The security device according to claim 6, comprising:
a device for, when communication with the certification authority is disabled, generating a public key pair of an electronic key data signature generating key (SMK') serving as a private key and an electronic key data signature verification key (VMK') serving as a public key;
a device for generating a public key certificate (CERT') by using an electronic data signature generating key (SMK) of an ID device serving as a transfer source for the electronic key data signature verification key (VMK'); and
a device for, when communication with the certification authority is recovered, requesting the certification authority to update the public key certificate (CERT').

8. The security device according to claim 6, comprising:
a device for, when the electronic key device is lost, requesting a certification authority to reissue electronic key data;
a device for, when the re-issuance is requested, if a user specific key (I) is received from an ID device of an owner of the lost electronic key device, outputting the user specific key to the certification authority; and
a device for inputting another new electronic key data received from the certification authority to a new electronic key device.

9. A vehicle authenticating device having the security device according to claim 1, the vehicle authenticating device comprising:
a certificate reading device for reading a certificate (C) in the ID device to input the read certificate to the security device;
a user information input device for inputting the user authentication information to the security device;
an electronic key reading device for reading electronic key data (K) in the electronic key device to the security device; and
an engine control device for controlling the engine in accordance with the engine startup information.

10. A vehicle authenticating method for use in a vehicle authenticating device which is mounted on a vehicle capable of running in accordance with engine startup information and which authenticates a user of the vehicle based on an electronic key device having electronic key data (K) stored therein, the method comprising:
storing an encrypted engine master key (E (EK)) obtained by encrypting an engine master key (EK) in accordance with the electronic key data (K);
storing in a memory an ID device certificate verification key (CK) to verify a certificate (C) in an ID device having a personal information for specifying an individual user, the certificate (C), and a user specific key (I);
verifying the certificate (C) input from the ID device by using an IC device certificate verification key (CK) in the memory to confirm validity of the ID device;
after confirming the validity of the ID device, causing the ID device to verify a user inputted authentication information by transmitting the user inputted authentication information to the ID device, the ID device verifying the user inputted authentication information based on the personal information;
storing in the memory an electronic key data signature verification key (VMK) to verify a digital signature applied to an electronic key data (K);
when a verification result by the ID device has been successfully obtained, authenticating the digital signature of the electronic key data (K) based on the electronic key data signature verification key (VMK), the electronic key data (K) inputting from the electronic key device;
when authentication of the digital signature of the electronic key data (K) has been successfully made, decrypting the encrypted engine master key (E (EK)), and then, obtaining an engine master key (EK), based on the electronic key data (K);
producing the engine startup information by using the engine master key (EK); and
outputting the obtained engine startup information.

11. A program for use in a computer of a vehicle authenticating device which is mounted on a vehicle capable of running in accordance with engine startup information and which authenticates a user of the vehicle based on an electronic key device having electronic key data (K) stored therein, the program stored in the vehicle authenticating device, the program comprising:
a first program code for causing the computer to execute a processing operation of storing in a memory an encrypted engine master key (E (EK)) produced when an engine master key (EK) is encrypted in accordance with the electronic key data (K);
a second program code for causing the computer to execute a processing operation of storing in a memory an ID device certificate verification key (CK) to verify a certificate (C) in an ID device having a personal information for specifying an individual user, the certificate, and a user specific key (I);

a third program code for causing the computer to execute a processing operation of verifying the certificate (C) input from the ID device by using an ID device certificate verification key (CK) in the memory to confirm validity of the ID device;

a fourth program code for causing the computer to execute a processing operation of, after confirming the validity of the ID device, causing the ID device to verify user inputted authentication information by transmitting the user inputted authentication information to the ID device, the ID device verifying the user inputted authentication information based on the personal information;

a fifth program code for causing the computer to execute a processing operation of storing in the memory an electronic key data signature verification key (VMK) to verify a digital signature applied to an electronic key data (K);

a sixth program code for causing the computer to execute a processing operation of, when a verification result by the ID device has been successfully obtained, authenticating the digital signature of the electronic key data (K) based on the electronic key data signature verification key (VMK), the electronic key data (K) inputting from the electronic key device;

a seventh program code for causing the computer to execute a processing operation of, when authentication of the digital signature of the electronic key data (K) has been successfully made, decrypting the encrypted engine master key (E (EK)), and then, obtaining an engine master key (EK), based on the electronic key data (K);

an eighth program code for causing the computer to execute a processing operation of producing the engine startup information by using the engine master key (EK); and a ninth program code for causing the computer to execute a processing operation of outputting the obtained engine startup information.

\* \* \* \* \*

UNITED STATES PATENT AND TRADEMARK OFFICE
CERTIFICATE OF CORRECTION

PATENT NO. : 7,868,736 B2
APPLICATION NO. : 11/492188
DATED : January 11, 2011
INVENTOR(S) : Fukushima et al.

It is certified that error appears in the above-identified patent and that said Letters Patent is hereby corrected as shown below:

In the Claims

Claim 3, column 20, line 40, change "authentication device for" to --authentication device--.

Signed and Sealed this
Seventeenth Day of June, 2014

Michelle K. Lee
*Deputy Director of the United States Patent and Trademark Office*